(12) United States Patent
Kano et al.

(10) Patent No.: US 6,963,381 B2
(45) Date of Patent: Nov. 8, 2005

(54) ACTIVE MATRIX DISPLAY DEVICE WITH ASYMMETRICAL REFLECTION, AND INSULATING LAYER WITH A CORRUGATED SURFACE AND A FLAT PORTION

(75) Inventors: Mitsuru Kano, Fukushima-ken (JP); Katsumasa Yoshii, Fukushima-ken (JP); Yuzo Hayashi, Fukushima-ken (JP); Hiroyuki Hebiguchi, Miyagi-ken (JP); Masahiko Yamaguchi, Miyagi-ken (JP)

(73) Assignee: Alps Electronic Co., Ltd., Tokyo (JP)

( * ) Notice: Subject to any disclaimer, the term of this patent is extended or adjusted under 35 U.S.C. 154(b) by 34 days.

(21) Appl. No.: 10/627,890

(22) Filed: Jul. 24, 2003

(65) Prior Publication Data

US 2004/0017528 A1 Jan. 29, 2004

(30) Foreign Application Priority Data

Jul. 26, 2002 (JP) .............................. 2002-218931

(51) Int. Cl.[7] ........................ G02F 1/1335; G02F 1/136
(52) U.S. Cl. ........................ 349/113; 349/51; 349/52; 349/114
(58) Field of Search ........................ 349/113, 111, 44, 349/42, 51, 52, 114

(56) References Cited

U.S. PATENT DOCUMENTS

| | | | | |
|---|---|---|---|---|
| 4,904,060 | A * | 2/1990 | Grupp ........................ | 349/162 |
| 5,805,252 | A * | 9/1998 | Shimada et al. ............ | 349/113 |
| 6,172,728 | B1 * | 1/2001 | Hiraishi ..................... | 349/139 |
| 6,208,395 | B1 * | 3/2001 | Kanoh et al. ............... | 349/113 |
| 6,219,119 | B1 | 4/2001 | Nakai | |
| 6,342,935 | B1 | 1/2002 | Jang et al. | |
| 6,362,866 | B1 * | 3/2002 | Yamazaki et al. .......... | 349/149 |
| 6,421,106 | B1 * | 7/2002 | Takatsuka et al. .......... | 349/113 |
| 6,424,399 | B1 * | 7/2002 | Shimada et al. ............ | 349/147 |
| 6,459,463 | B2 * | 10/2002 | Kim et al. .................. | 349/113 |
| 6,600,536 | B1 * | 7/2003 | Kuwabara et al. .......... | 349/117 |
| 6,727,967 | B2 * | 4/2004 | Nakamura et al. .......... | 349/114 |
| 6,753,938 | B2 * | 6/2004 | Hanazawa et al. .......... | 349/113 |
| 6,806,927 | B2 * | 10/2004 | Nimura ..................... | 349/113 |
| 2002/0030774 | A1 * | 3/2002 | Yoshii et al. ............... | 349/113 |

FOREIGN PATENT DOCUMENTS

| | | |
|---|---|---|
| EP | 0 536 898 A | 4/1993 |
| EP | 0 867 747 A2 | 9/1998 |
| EP | 1 174 735 A2 | 1/2002 |
| JP | 2002-311449 | 10/2002 |

OTHER PUBLICATIONS

Fully Self-Aligned Tri-Layer Alpha-Si:H Thin-Film Transistors with Deposited Doped Contact Layer, Thomasson D.B. et al, IEEE Electron Device Letters, IEEE, Inc., vol. 19, No. 4, (Apr. 1, 1998) pp. 124-126.

(Continued)

Primary Examiner—Andrew Schechter
(74) Attorney, Agent, or Firm—Brinks Hofer Gilson & Lione

(57) ABSTRACT

An active matrix display device includes a pair of substrates, an optical modulation layer lying between the substrates, a plurality of pixel electrodes on one of the substrates, switching elements for driving the respective pixel electrodes provided in the vicinity of the pixel electrodes, and a reflective or transflective reflecting layer 138 formed on at least one substrate more distant from a viewer side. The reflecting layer has asymmetrical reflection properties.

11 Claims, 18 Drawing Sheets

OTHER PUBLICATIONS

Influence of Current-Voltage Characteristics on Image-Sticking of Thin-Film Diode Liquid-Crystal Displays, Hirai T. et al, Japanese Journal of Applied Physics, Publication Office Japanese Journal of Applied Physics., Tokyo, Japan, vol. 38, No. 9A, Part 1, (Sep. 1999), pp. 5287-5291.

* cited by examiner

ACTIVE MATRIX DISPLAY DEVICE WITH ASYMMETRICAL REFLECTION, AND INSULATING LAYER WITH A CORRUGATED SURFACE AND A FLAT PORTION

This application claims priority to Japanese Patent Application 2002-218931, filed on Jul. 26, 2002.

BACKGROUND OF THE INVENTION

1. Field of the Invention

The present invention relates to an active matrix display device suitably used as reflective and transflective display devices and the like displaying images by the use of external light reflection.

2. Description of the Related Art

In the field of display devices, active matrix liquid crystal display devices capable of displaying high-quality images have been widely used. This type of liquid crystal display devices includes a liquid crystal layer disposed between a pair of substrates. One of the substrates has pixel electrodes arrayed in a matrix thereon. Each pixel electrode has a switching element using a thin film transistor or thin film diode to ensure switching from one pixel electrode to another. Thus, the size and the resolution of the liquid crystal display devices can be easily increased.

Among these liquid crystal display devices, reflective and transflective display devices have been proposed in which a diffuse-reflective reflecting film is provided on the lower substrate, which is more distant from viewers than the other substrate, to reduce parallaxes, thereby displaying bright images in a wider area.

For example, Japanese Unexamined Patent Application Publication No. 5-281533 discloses a liquid crystal display device including light-reflective pixel electrodes 200 arranged in a matrix when viewed from above, shown in FIG. 20, and many small doughnut-shaped projections 201 and small cylindrical projections 202, shown in FIG. 21, on the pixel electrodes 200. In this liquid crystal display device, the doughnut-shaped projections 201 having a height of about 1 μm, an outer diameter of about 20 μm, and an inner diameter of about 5 μm and the cylindrical projections 202 having a height of about 1 μm and a diameter of about 14 μm are formed on the surface of an insulating layer coating thin film transistors 204. These projections 201 and 202 are covered with the pixel electrodes 200 formed of a conductive film. Thus, the plurality of light-reflective projections 201 and 202 are formed in the above-described shapes.

Also, Japanese Patent No. 3019058 discloses a liquid crystal display device in which thin film transistors 212 are formed on a lower substrate side of a pair of substrates 210 and 211 lying in the vertical direction, as shown in FIG. 22, and covered with an insulating layer 213, and light-reflective pixel electrodes 215 are formed on the insulating layer 213. The insulating layer 213 has projections and depressions, so that the pixel electrodes 215 overlying the insulating layer 213 have at least two types of regions 216 and 217 with different light scattering directivities on the surface thereof. The maximum sizes of the regions 216 and 217 are set to be a predetermined area or less (for example, 5 mm square or less).

In order to form the pixel electrodes 215, the surface of the insulating layer 213 may be subjected to sandblasting to increase its roughness, or the upper surface of glass may be etched with fluorine to increase the roughness. Alternatively, the surface of a polyimide film may be dry-etched to increase the roughness.

In the case shown in FIG. 22, the regions 216 are formed in a shape having gentle slopes and the regions 217 are formed in another shape having steep slopes. Thus, these types of regions 216 and 217 allow light to reflect differently from each other. While the regions 216 produce scattering light having relatively high directivity, the regions 217 produce scattering light having relatively high diffusibility, as designated by arrows in FIG. 22.

A reflecting film formed by the above-mentioned sandblasting or etching reflects light such that the incident angle and the reflection angle are bilaterally symmetrical with respect to the vertical center line between the incident light and the reflected light; hence, the reflection from the reflecting film exhibits Gaussian distributions, as shown by curves $A_1$, $B_1$, and $C_1$ in FIG. 23.

In general, viewers watch a liquid crystal display device with the liquid crystal panel tilted with respect to the viewers. Therefore, while a liquid crystal display device exhibiting a Gaussian distribution in reflection can display bright images having a narrow peak in a specific range, as shown in FIG. 23, brightness is liable to decrease in a light-receiving region close to the viewer side, which is the most important region in practice, from the normal to the liquid crystal panel. Also, sufficient brightness covering a large area cannot, disadvantageously, be provided in the practically most important light-receiving region close to the viewer side from the normal to the liquid crystal panel.

In addition, when sandblasting or etching treatment is performed on the insulating layer, acting as the base layer of the reflecting layer, various types of wires and the thin film transistors or thin film diodes underlying the reflecting layer are likely to be damaged.

Also, the liquid crystal display device having the projections 201 and 202 shown in FIGS. 20 and 21 lead to the same reflection properties as in the foregoing liquid crystal device, having reflection characteristics exhibiting bilaterally symmetrical Gaussian distribution, and, therefore, has the same problem as in the foregoing liquid crystal display device.

SUMMARY OF THE INVENTION

Accordingly, an object of the present invention is to provide an active matrix display device having asymmetrical reflection properties and achieving brightness as much as possible in the practically most important light-receiving region close to viewers from the normal to the liquid crystal panel.

Another object of the present invention is to provide an active matrix display device capable of displaying color images, in addition to achieving the brightness as much as possible in the practically most important region.

Still another object of the present invention is to provide an active matrix display device having a structure facilitating manufacture thereof without negatively affecting switching elements and wires, in addition to the brightness as much as possible in the practically most important region.

According to an aspect of the present invention, an active matrix display device is provided which includes a pair of substrates, an optical modulation layer lying between the substrates, a plurality of pixel electrodes formed on one of the substrates, switching elements for driving the respective pixel electrodes provided in the vicinity of the pixel electrodes, and a reflective or transflective reflecting layer formed on at least one substrate more distant from a viewer side. The reflecting layer has asymmetrical reflection properties.

Since the active matrix display device includes the reflecting layer having asymmetrical reflection properties, but not symmetrical reflection properties exhibiting a simple Gaussian distribution, it can collect more light to a desired direction so as to display brighter images in the desired direction. By setting this desired direction so as to align with the viewer side, the resulting display device can achieve brighter images than that of a display device exhibiting a Gaussian distribution, in practice.

The cross section of the reflecting layer may have a corrugated surface whose phase from the light-entering direction to the light-receiving direction has asymmetrical curvatures with respect to the normal to the substrate.

By providing the corrugated surface having asymmetrical curvatures with respect to the normal to the substrate to the phase from the light-entering direction to the light-receiving direction, the resulting liquid crystal display device can collect more light to a desired direction in the area from the light-entering direction to the light-receiving direction so as to display brighter images in the desired direction, without exhibiting simple symmetrical reflection characteristics. By setting this desired direction so as to align with the viewer side, the resulting display device can achieve brighter images than that of a display device exhibiting a Gaussian distribution, in practice.

The curve of the cross section of the reflecting layer may comprise two curves having different curvatures from each other.

As a result, the resulting liquid crystal display device can collect more light to a desired direction in the area from the light-entering direction to the light-receiving direction so as to display brighter images in the desired direction.

The maximum tilt angle of the curvatures may be 30°.

A tilt angle more than 30° leads to an excessively increased diffusion angle of reflected light. Consequently, reflection intensity is reduced and bright images cannot be achieved.

The switching elements may each comprise a thin film transistor, or each have an inverted-staggered shape.

The present invention can be applied to active matrix display devices whose switching transistors are thin film transistors or have an inverted-staggered shape.

The active matrix display device may further include a color filter. The switching elements are provided on one substrate closer to the viewer side, and a color filter is provided on the other substrate.

Thus, the resulting display device can display brighter color images in a desired direction by collecting more light in the desired direction.

Alternatively, the switching elements and the color filter may be provided on one substrate more distant from the viewer side.

Thus, the resulting display device can display brighter color images in a desired direction by collecting more light in the desired direction.

The pixel electrodes may double as the reflecting layer and each have a corrugated surface having asymmetrical curvatures.

The active matrix display device may include an insulating layer covering the switching elements. The insulating layer has a corrugated surface having asymmetrical curvatures. The pixel electrodes are formed along the corrugated surface so as to provide a corrugated surface having asymmetrical curvatures in the pixel electrodes.

The insulating layer may have contact holes in which conducting portions are formed, and the pixel electrodes and the respective switching electrodes are connected to each other with the conducting portions.

The switching elements may each be two-terminal element.

The active matrix display device may further include an insulating layer underlying the reflecting layer. The insulating layer is provided with a corrugated surface by stamping. The corrugated surface of the reflecting layer is formed using the corrugated surface in the insulating.

By providing the insulating layer having the projections and depressions formed by stamping, a corrugated surface can be formed without performing sandblasting or etching, which are likely to damage thin film transistors or thin film diodes and wires. Consequently, the thin film transistors or thin film diodes and wires are not damaged.

Preferably, the retardation value Δnd of a cell including the pair of substrates and the optical modulation layer between the substrates is in the range of 180 to 280 nm. Preferably, the optical modulation layer comprises liquid crystal and the twist angle of the liquid crystal is in the range of 60° to 90°.

Preferably, a polarizer, a first retardation film, and a second retardation film are disposed on the external side of the viewer side substrate, in that order from the outside. The absorption axis of the polarizer is, preferably, in the range of 70° to 90° in a counter clockwise direction when viewed from the viewer side. The retardation value Δnd and the slow axis of the first retardation film are, preferably, 100 to 140 percent to the Δnd of the foregoing cell and in the range of 0° to 20°, respectively. The retardation value Δnd and the slow axis of the second retardation film are, preferably, 40 to 70 percent to the Δnd of the foregoing cell and in the range of 55° to 75°, respectively.

DESCRIPTION OF THE PREFERRED EMBODIMENTS

Figure 1:
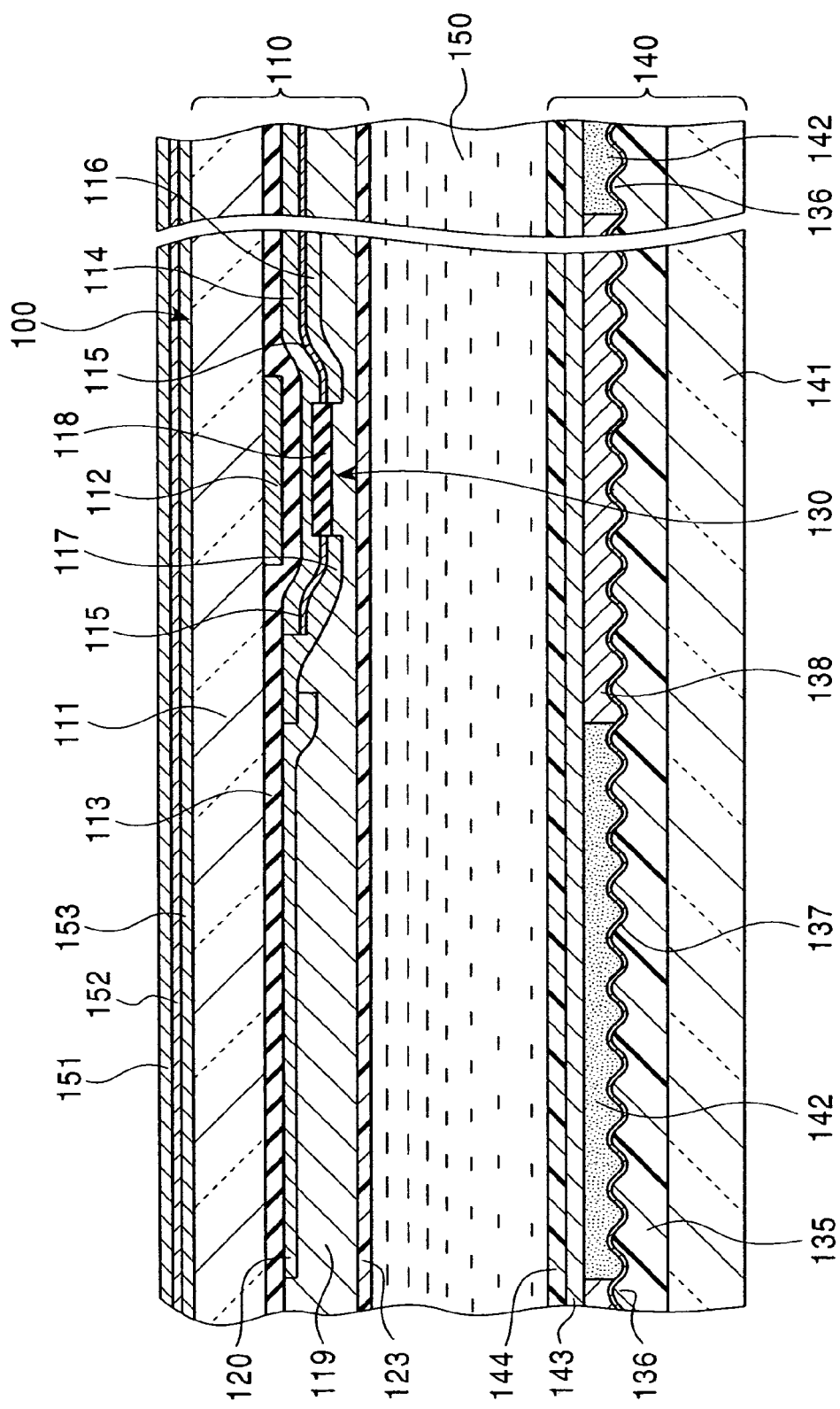
FIG. 1 is a sectional view of a liquid crystal panel included in an active matrix display device according to an embodiment of the present invention.

An active matrix display device according to an embodiment of the present invention will now be described, using a reflective liquid crystal display device with reference to the drawings. The proportions of the thicknesses, sizes, and the like of parts in the drawings are changed if necessary, for ease of view.

Figure 2:
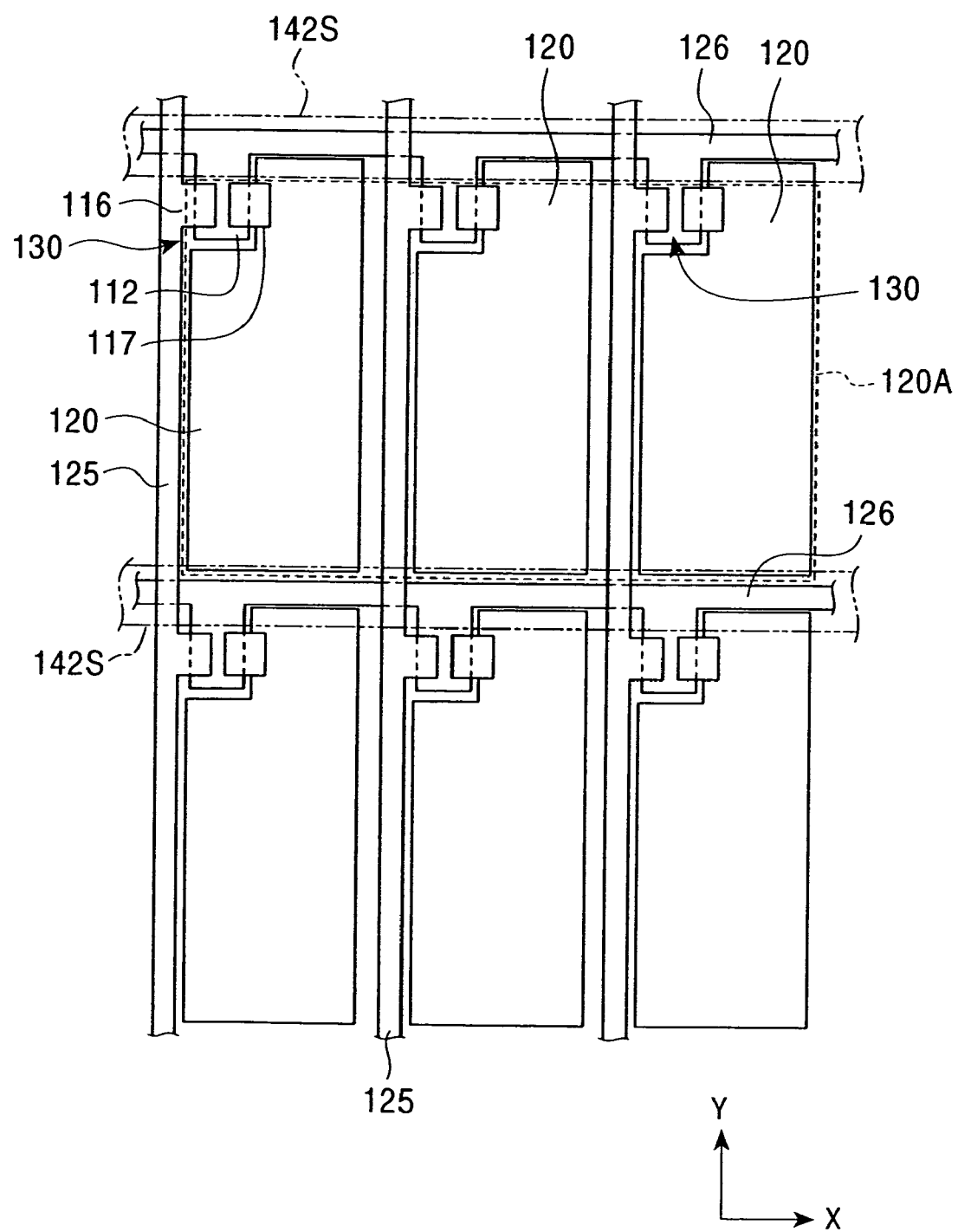
FIG. 2 is a plan view of the liquid crystal panel.

FIG. 1 is a sectional view of a reflective liquid crystal display device according to an embodiment of the present invention, and FIG. 2 is a plan view of pixel electrodes of the liquid crystal display device. As shown in FIG. 1, a liquid crystal panel 100 of the reflective liquid crystal display device includes an element side substrate 110, an opposing substrate 140, and a liquid crystal layer 150, acting as an optical modulation layer, disposed between the substrates 110 and 140. On the external side of the substrate 110, a polarizer 151, a first retardation film 152, and second retardation film 153 are disposed in that order from the outside. The substrates 110 and 140 are rectangular in plan view and a sealant is provided in the outer region between the substrates, but not shown in FIG. 1. The liquid crystal layer 150 lies between the substrates 110 and 140 and are surrounded by the substrates and the sealant.

As shown in FIG. 1, the element side substrate 110 includes a plurality of scanning lines 126 and signal lines 125 respectively extending in the row direction (x direction) and the column direction (y direction), shown in FIG. 2, on a base substrate 111 formed of glass, plastic, or the like, with electrical insulation from each other. A TFT (switching element) 130 is formed in the vicinity of each intersection of the scanning lines 126 and the signal lines 125. Pixel electrodes 120 are formed corresponding to the regions surrounded by the scanning lines 126 and the signal lines 125. The regions having the pixel electrodes 120, the TFTs 130, and the scanning lines 126 and signal lines 125, on the substrate 110 are hereinafter referred to as a pixel region, an element region, and a wiring region, respectively.

Each TFT 130 has an inverted-staggered structure, and includes a gate electrode 112, a gate insulating layer 113, semiconductor layers 114 and 115, a source electrode 116, and a drain electrode 117 on the base substrate 111, in that order from the bottom. Specifically, part of each scanning line 126 extends to form the gate electrode 112, and the semiconductor layer 114 is formed in an island manner so as to lie across the gate electrode 112, in plan view, on the gate insulating layer 113 covering the gate electrode 112. The source electrode 116 is formed on one side of the semiconductor layer 114 separated by the semiconductor layer 115, and the drain electrode 117 is formed on the other side, separated by the semiconductor layer 115. An island-shaped insulating film 118 is disposed on the semiconductor layer 114, and the foregoing source electrode 116 and drain electrode 117 are separated by the insulating film 118 such that their ends oppose each other. The insulating film 118 functions as an etching-stopper layer to protect the semiconductor layer 114 when the semiconductor layer 114 is formed.

The base substrate 111 may be formed of a synthetic resin, such as polyvinyl chloride, polyester, or polyethylene terephthalate, or a natural resin, instead of glass. Alternatively, a conductive substrate formed of, for example, stainless steel covered with an insulating layer may be used. In this instance, wires and elements are provided on the insulating layer.

The gate electrode 112 is formed of a metal, such as aluminium (Al), molybdenum (Mo), tungsten (W), tantalum (Ta), titanium (Ti), copper (Cu), or chromium (Cr), or an alloy containing at least one of theses metals, such as Mo—W, and is integral with the corresponding scanning line 126 extending in the row direction, as shown in FIG. 2.

The gate insulating layer 113 is formed of a silicon insulative film, such as of silicon oxide ($SiO_x$) or silicon nitride ($SiN_y$), and spreads over substantially the entire surface of the substrate 111 to cover the scanning line 126 and the gate electrode 112.

The semiconductor layer 114 is an i-type semiconductor formed of non-doped amorphous silicon (a-Si) or the like. The region where the semiconductor layer 114 and the gate electrode 112 oppose each other with the gate insulating layer 113 therebetween is defined as a channel region.

The source electrode 116 and the drain electrode 117 are formed of a metal, such as Al, Mo, W, Ta, Ti, Cu, or Cr, or an alloy containing at least one of these metals, and are disposed on the semiconductor layer 114 so as to oppose each other with the channel region therebetween. The source electrode 116 is formed by extending the corresponding signal line 125 arranged in the column direction. In order to establish an good Ohmic contact between the semiconductor layer 114 and the source and drain electrodes 116 and 117, an n-type semiconductor layer 115 doped with a high concentration of a Group V element, such as phosphorus (P), is provided between the semiconductor layer 114 and the source and drain electrodes 116 and 117.

The drain electrode 117 is connected to the corresponding pixel electrode 120 formed of a high-reflective metal, such as Al or Ag. The pixel electrodes 120 are arranged in a matrix on the gate insulating layer 113. The pixel electrodes 120 are disposed corresponding to the regions surrounded by the scanning lines 126 and the signal lines 125. The sides of each pixel electrode 120 are along the scanning lines 126 and the signal lines 125. The pixel electrode 120 defines a pixel region, not including the TFTs 130, scanning lines 126, and signal lines 125.

The base substrate 111 is covered with an alignment layer 123 formed of polyimide or the like subjected to a predetermined orientation, such as rubbing, so as to cover the insulating layer 119.

On the other hand, the opposing substrate 140 functions as a color filter array substrate, and includes a base substrate 141 formed of glass, plastic, or the like, and an insulating layer 135 and a color filter layer 142, shown in FIG. 1, are formed on the base substrate 141.

Figure 4:
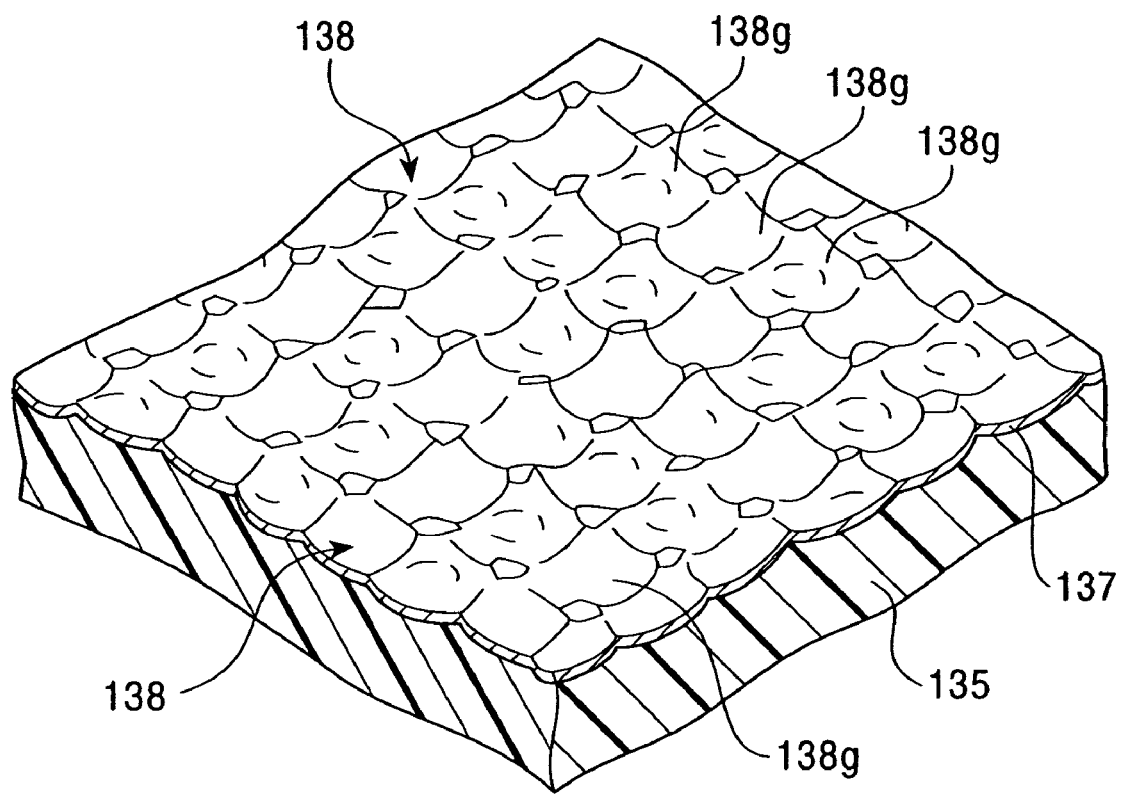
FIG. 4 is a perspective view of a corrugated portion of a reflecting layer included in the liquid crystal panel.

The insulating layer 135 is formed of an organic insulative material, such as an acrylic resin, a polyimide resin, and a benzocyclobutene (BCB) polymer. The organic insulating layer 135 is deposited to a relatively large thickness on the base substrate 141, and is provided with an corrugated portion 136 having a plurality of projections and depressions on the upper surface side (liquid crystal side) of the insulating layer 135 corresponding to at least the pixel regions, as shown in FIG. 4, by contact-bonding a transfer pattern to the surface of the insulating layer 135 or similar techniques. A reflecting layer 137 formed of a high-reflective metal, such as Al or Ag is further disposed on the corrugated portion 136. The reflecting layer 137 also has a corrugated portion 138 in a shape fitting the foregoing corrugated potion 136. The corrugated portion 138 will be described in detail later. The corrugated portion 138 of the reflecting layer 137 allows part of the light entering into the liquid crystal panel 100 to diffuse, thereby achieving a brighter image covering a wide viewing area.

Figure 3:
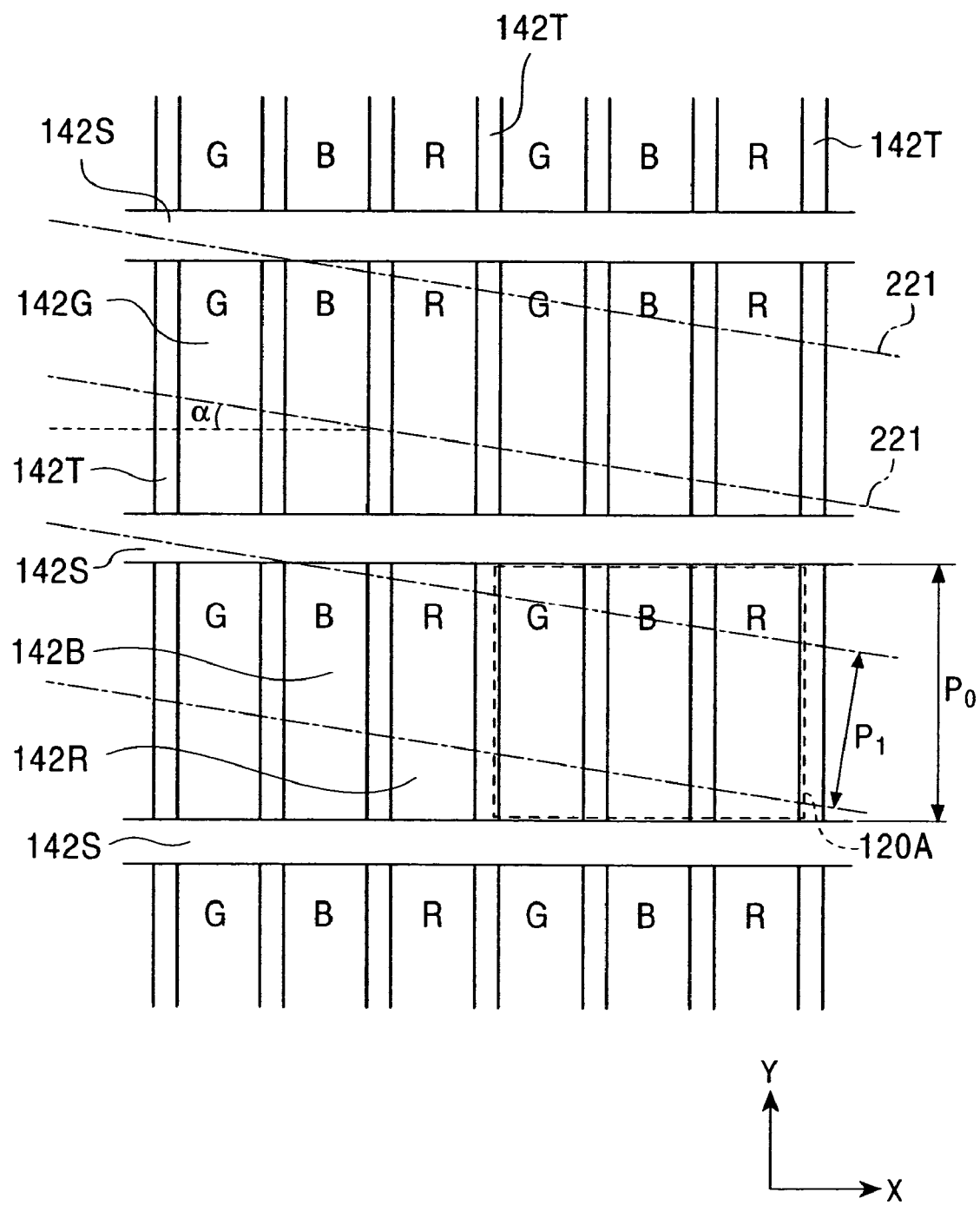
FIG. 3 is a plan view of color filters of the liquid crystal panel.

The color filter layer 142 includes color filters 142R, 142G, and 142B respectively transmitting light rays having red (R), green (G), and blue (B) wavelengths. The color filters 42R, 142G, and 142B are periodically arranged, as shown in FIG. 3, and oppose the pixel electrodes 120.

The color filter layer 142 is provided with light-shielding films 142S and 142T in the regions thereof not having the color filters 142R, 142G, and 142B. The light-shielding films 142S are arranged such as to cover the scanning lines 126 when viewed from above, as designated by two-dot chain lines in FIG. 2, and the light-shielding films 142T are arranged such as to cover the signal lines 125.

A transparent opposing electrode (common electrode) 143 formed of ITO, IZT, or the like is disposed on the color filter layer 142. Furthermore, an alignment layer 144 is formed of polyimide or the like subjected to a predetermined orientation so as to oppose at least the display region of the substrate 140.

Figure 5:
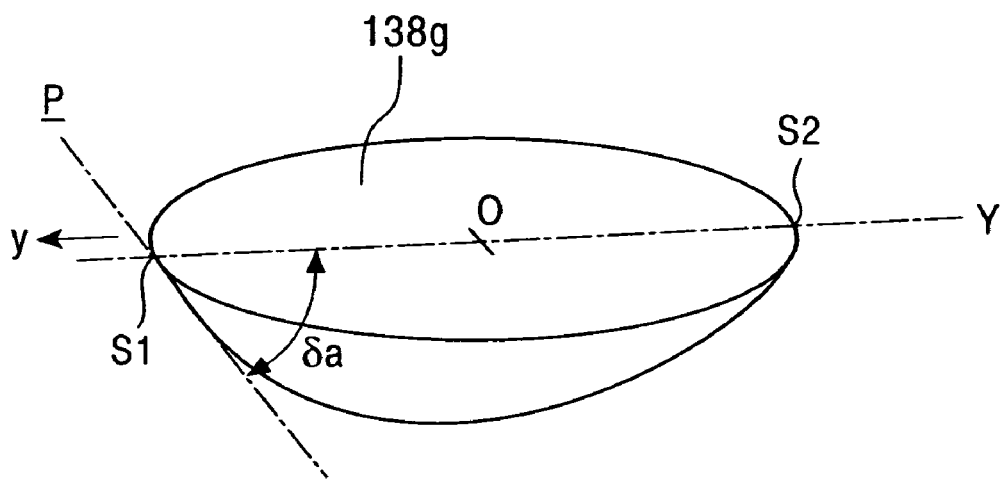
FIG. 5 is a perspective view of one depression in the corrugated portion.
Figure 6:
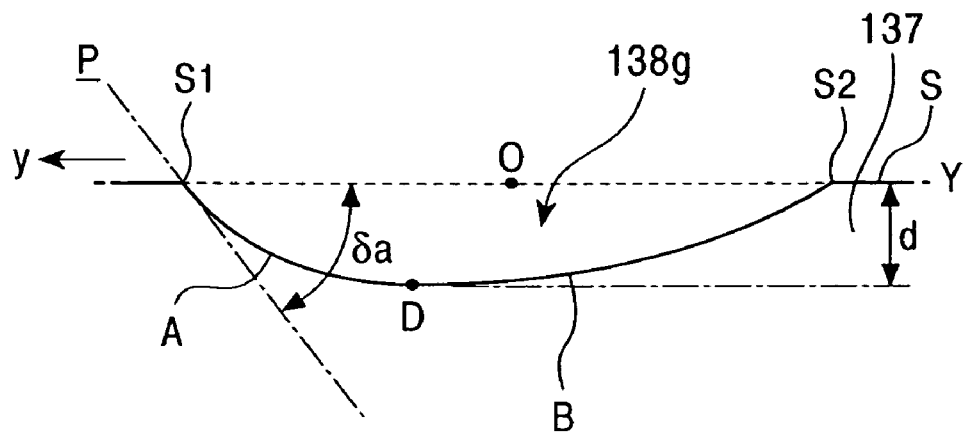
FIG. 6 is an enlarged sectional view of the depression shown in FIG. 5.
Figure 7:
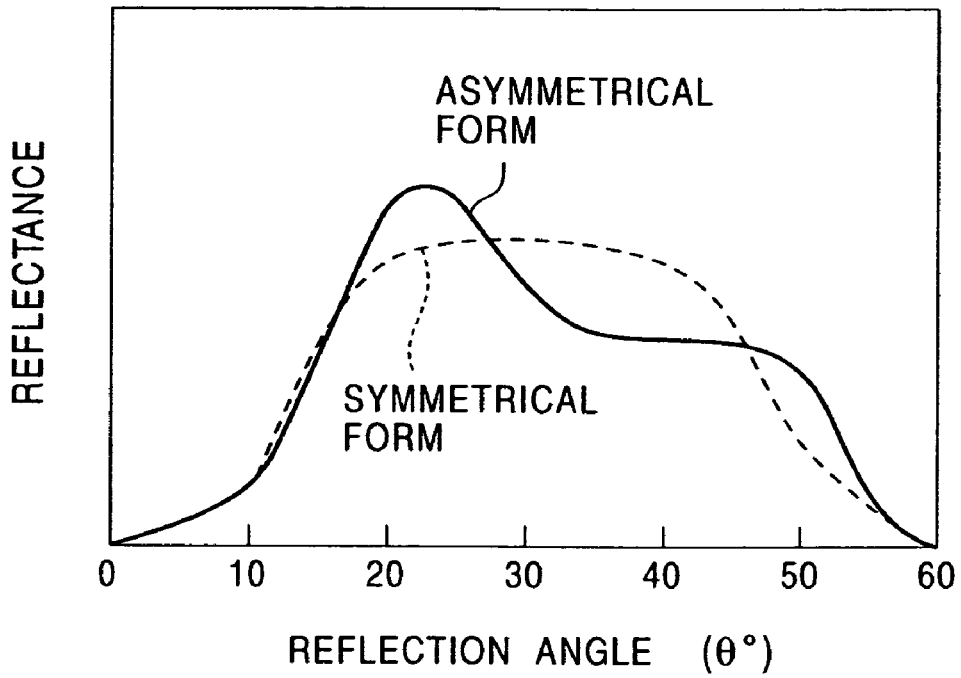
FIG. 7 is a graph showing reflection characteristics of the reflecting layer of the liquid crystal panel.

FIG. 5 is a perspective view of one depression 138g of the corrugated portion 138; FIG. 6 is a sectional view of the depression 138g taken along the Y axis; and FIG. 7 shows reflection properties of the depression.

Specifically, the Y-section shape of the depression 138g is composed of a first curved surface having a small curvature and a second curved surface having a large curvature. In the Y section shown in FIG. 6, the first curved surface is designated by a first curve A drawn from one outer edge S1 of the depression 138g to the deepest point D and the second curved surface is designated by a contiguous second curve B drawn from the deepest point D of the depression 138g to the other outer edge S2. As shown in FIG. 4, the plurality of depressions 138g adjoining in the surface direction of the insulating layer 135 are arranged at random intervals, so that the occurrence of moiréfringes resulting from the arrangement of the projections 138g is prevented.

The depth of each depression 138g refers to the distance from the surface of the reflecting layer 137 to the bottom of the depression 138g, and the interval between two adjoining depressions 138g refers to the distance between the centers of the depressions 138g having circular shapes when viewed from above. The tilt angle of the internal surface of the depression 138g refers to the angle δa of the inclined surface in an arbitrary small area on the internal surface of the depression 138g, having a width of, for example, 0.5 μm, with respect to the horizontal surface (surface of the reflecting layer 137) S, as shown in FIG. 5.

The deepest point D of the depression 138g is shifted from the center O of the depression 138g in the y direction. The average tilt angles of the first curve A and the second curve B with respect to the surface S of the reflecting layer 137 (horizontal surface S) are set in the range of 1° to 89° and the range of 0.5° to 88°, respectively. The average tilt angle of the first curve A is larger than that of the second curve B. The tilt angle δa at the outer edge S1 of the first curve A, which is the maximum tilt angle, is in the rage of about 4° to 35°, and preferably in the range of 4° to 30°, thus varying at random from one depression 138g to another. Accordingly, the depth d of the depressions 138g varies at random in the range of 0.25 to 3 μm. Also, the diameter of the depressions 138g is set in the range of 5 to 100 μm from the viewpoint of the ease of manufacture.

A depth of depression 138g of less than 0.25 μm does not sufficiently achieve the effect of diffusing reflected light. In contrast, a depth of more than 3 μm brings about the need of increasing the interval between the depressions 138g to satisfy the requirement for the tilt angle of the internal surface, and this is likely to cause moiréfringes.

FIG. 7 shows the relationship between the reflection angle and the reflection brightness when light is emitted to the reflecting layer 137 having an asymmetrical shape, shown in FIGS. 5 and 6, from the y direction at an incident angle of 30°. For the sake of comparison, FIG. 7 shows the refection characteristics of a symmetrical reflecting layer having an arc-shaped section, which corresponds to the Y section of the reflecting layer 137, together with those of the reflection layer 137.

Figure 8:
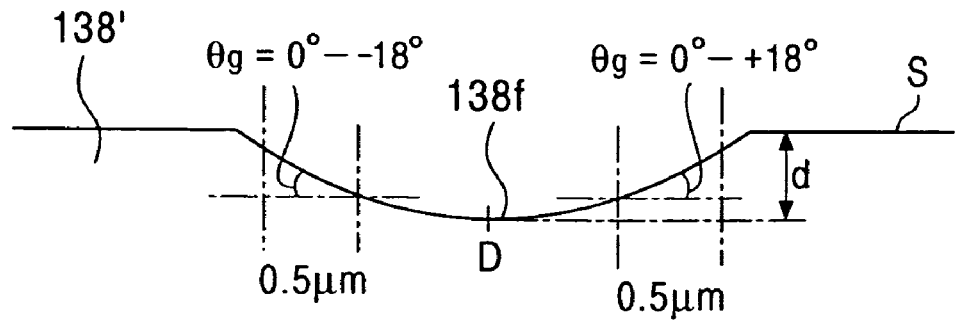
FIG. 8 is a representation of reflection properties of a reflecting layer in a comparative liquid crystal panel.

This symmetrical reflecting layer refers to a reflecting layer 138' having arc-shaped depressions 138f shown in FIG. 8. The tilt angle θg of the internal surface of the depressions 138f is set in the range of −18° to +18°. The depth d of the depressions 138f is varied at random in the range of 0.25 to 3 μm. The diameter of the depressions 138f is set in the range of 5 to 100 μm. The interval between two adjoining depressions 138f is set at random.

As shown in FIG. 7. light entering into the liquid crystal panel from the y direction side at an angle of 30° is reflected at the asymmetrical reflecting layer 137. The brightness of the reflected light becomes higher than that in a symmetrical reflecting layer when the reflection angle is less than the mirror reflection angle, namely, 30° (about 20°). In contrast, it becomes lower than that in the symmetrical reflecting layer when the reflection angle is larger than 30° (about 40°). Since the deepest point D of the depression 138g is shifted from the center O of the depression 138g in the y direction, the percentage of reflection from the second curve becomes larger than that from the first curve, and, accordingly, the brightness of reflective images increases at the y direction side.

Figure 23:
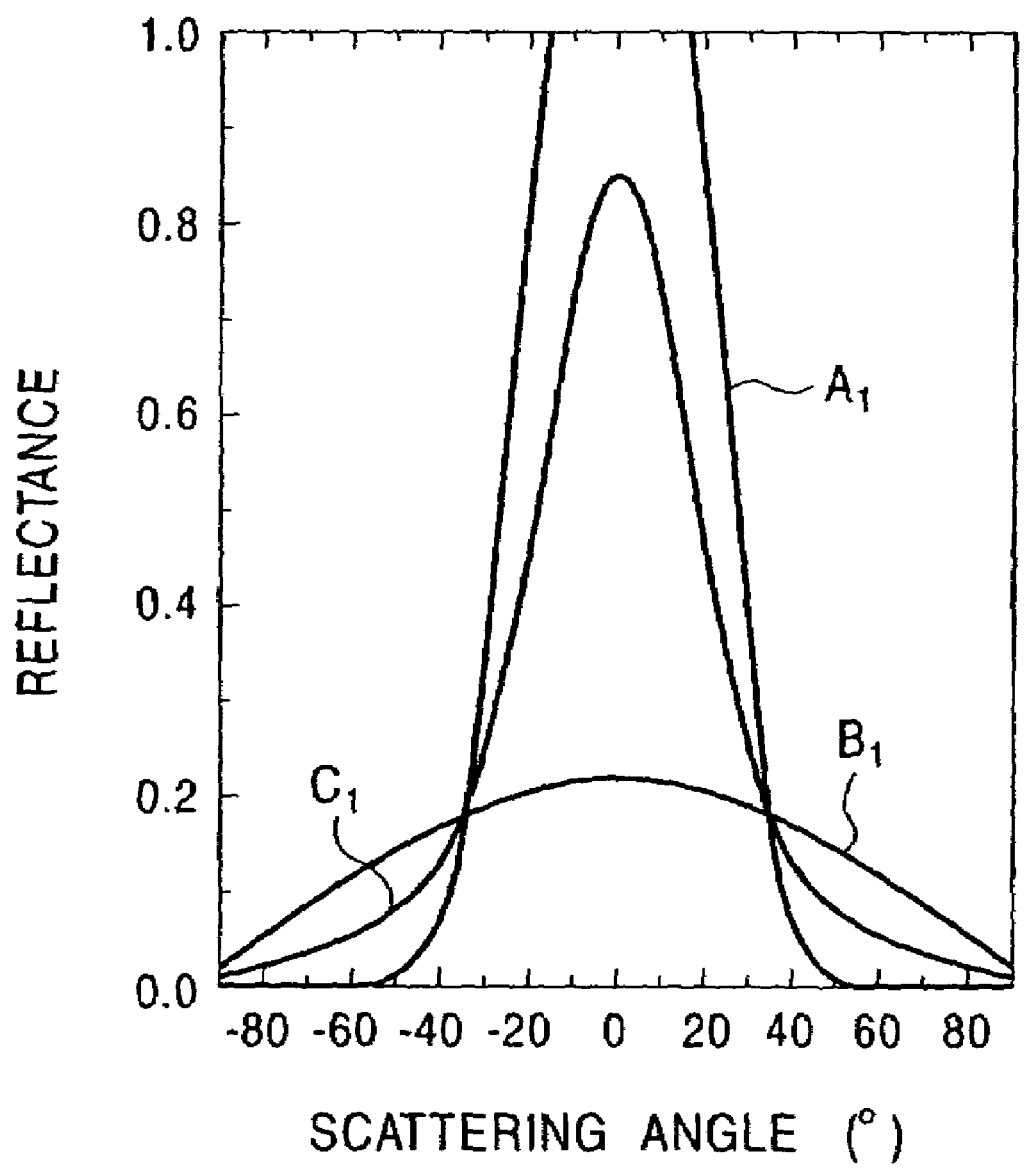
FIG. 23 is a graph showing reflection characteristics obtained from the liquid crystal panel shown in FIG. 22.

Reflected light from symmetrical reflecting layer 138', shown in FIG. 8, produces reflection with a uniform brightness in a wider area (about 15° to 45°) than a reflecting layer having reflection properties exhibiting the Gaussian distribution shown in FIG. 23. Hence, even such reflection properties provide a brighter image than reflection exhibiting Gaussian distribution to viewers in practice. Although reflection properties exhibiting a Gaussian distribution achieve a highly bright image at a specific narrow angle, the brightness of the image degrades extremely even at an angle slightly outside the narrow angle. In contrast, the reflection properties of the asymmetrical reflecting layer 137 can produce an image having a uniform brightness to some extent in an area defined by a large angle of about 15° to 45° with respect to viewers in practice, and an image having much higher brightness in an area defined by an angle of 15° to 25° with respect to the viewer, if the reflecting layer 137 is arranged so that the peek of the brightness lies between 15° to 25° with respect to the viewers.

The substrates 110 and 140 are held with a predetermined distance maintained by a spacer (not shown in the drawings), and are bonded to each other with a thermosetting sealant (not shown in the drawings) applied in a rectangular frame form onto the outer regions of the substrates. Liquid crystal fills the space surrounded by the substrates 110 and 140 and the sealant to form the liquid crystal layer 150 serving as the optical modulation layer. Thus, the liquid crystal panel 100 is structured.

In the liquid crystal panel 100 having the depressions 138g, light incident from the outside of the element side substrate 110 is transmitted through the pixel electrodes 120 of the element side substrate 110 and the liquid crystal layer 150 and reflected at the reflecting layer 137. Thus, it is again transmitted through the liquid crystal layer 150 and the pixel electrodes 120 to return to the viewer side. In the course of this process, the pixel electrodes 120 control the orientation of the liquid crystal molecules in the liquid crystal layer 150 to control the state of light transmitted through the liquid crystal layer 150. Thus, whether an image is displayed or not, or whether the image is halftone is controlled.

In this instance, the brightness of reflected light at smaller angles than the mirror reflection angle, namely, 30° (15° to 25°) increases in comparison with reflection from the reflecting layer having symmetrical depressions. Therefore, by aligning the eye position of a viewer, that is, the viewing direction, with this direction, the viewer can obtain a brighter image than that of a liquid crystal panel having symmetrical depressions.

Also, since the color filter layer 142 is disposed right above the reflecting layer 137, as shown in FIG. 1, the distance between the layer reflecting light and the color filters for coloring is reduced, thereby realizing an image in which color spreading and muddiness resulting from parallax are reduced.

The depressions 138g is formed in the insulating layer 135 by transferring a corrugated form with a master pattern. Since the transfer is performed on the insulating layer 135 of the opposing substrate 140, the formation of the depressions 138g can be facilitated without consideration of preventing damage to the TFT 130 side during transfer. In addition, by providing a light-shielding layer between the color filter layer 142 so as to oppose the TFTs 130, unstable TFT 130 operation resulting from external light form the bottom side of the liquid crystal panel 100, or from, for example, the outside of the opposing substrate 140, can be prevented, and color mixture between the color filters 142R, 142G, and 142B can be prevented. Thus, an image having a high contrast ratio can be displayed.

Figure 9:
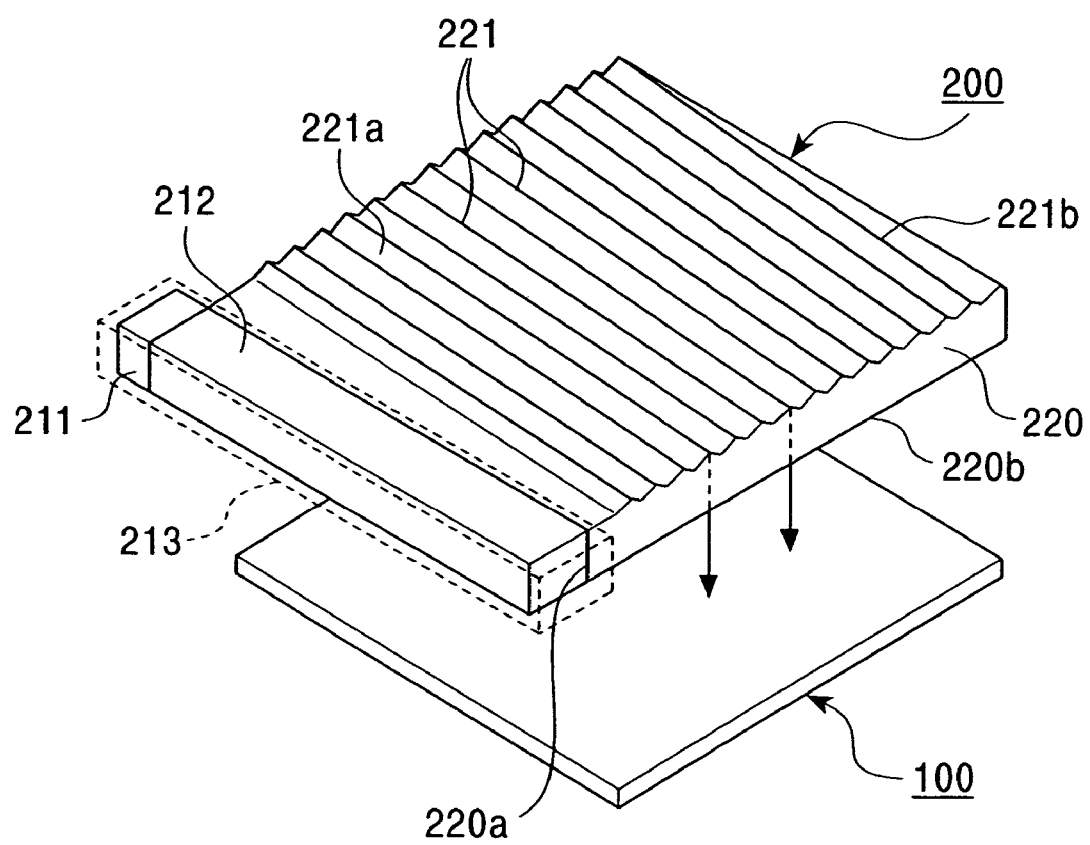
FIG. 9 is a perspective view of the general structure of an active matrix display device including a liquid crystal panel according to an embodiment of the present invention.

The liquid crystal panel 100 is used in a liquid crystal display device in combination with, for example, a front light 200 disposed on the upper surface of the liquid crystal panel 100, as shown in FIG. 9.

The front light 200 includes a plate-like light guide 220 formed of a transparent member, such as an acrylic resin, opposing the liquid crystal panel 100; an rectangular solid intermediate light guide 212 formed of a transparent member, such as an acrylic resin, on a side surface of the light guide 220; and an luminous element 211 comprising, for example, an light emitting diode (LED) on one end surface of the intermediate light guide 212 in the longitudinal direction, as shown in FIG. 9.

The intermediate light guide 212 lies substantially parallel to the light guide 220 with an airspace therebetween, and totally reflects light entering the interface between the airspace and the intermediate light guide 212 at a shallow depth to transmit the light through the intermediate light guide 212. In order to emit the light transmitted through the intermediate light guide 212 to the light guide 220, a wedge-shaped groove, not shown in the drawings, is formed in the surface of the intermediate light guide 212 opposite to the light guide 220, and a highly light-reflective metallic thin film of, for example, Al or Ag is formed in the groove.

The light guide 220 is disposed substantially parallel to the surface of the liquid crystal panel 100 with an airspace therebetween, and the side surface thereof opposing the intermediate light guide 212 acts as a light-entering surface 220a and the lower surface thereof opposing the liquid crystal panel 100 acts as a light-emitting surface 220b. In order to conduct light entering from the light-entering surface 220a to the light-emitting surface 220b, the light guide 220 is provided with prism-like grooves 221 in stripes on the upper surface thereof (the surface opposite to the liquid crystal panel 100).

The grooves 221 have a wave shape formed with a gentle slope 221a and a steep slope 221b. The extending direction of the grooves 221 is tilted by a predetermined angle α from the lying direction (x direction) of the pixels 120A of the liquid crystal panel, as shown in FIG. 3, so that the occurrence of moiréfringe resulting from interference between the grooves 221 and the pixels 120A can be prevented. The angle α is set in the range of more than 0° to 15°, and preferably in the range of 6.5° to 8.5°. Also, the pitch $P_1$ of the grooves 221 is set smaller than the pitch $P_0$ of the pixels so that the nonuniformity of lighting in a cycle of the pitch $P_1$ is leveled out in the pixels 120A so as not to be recognized. In particular, it is preferable to satisfy the relationship $0.5P_0 < P_1 < 0.75P_0$ between the pitch $P_1$ of the grooves 221 and the pitch $P_0$ of the pixels.

Preferably, the intermediate light guide 212 and the light guide 220 are integrally fixed in a case 213 having a metallic thin film with a high reflectance, such as Al or Ag, as shown in FIG. 9.

Figure 10:
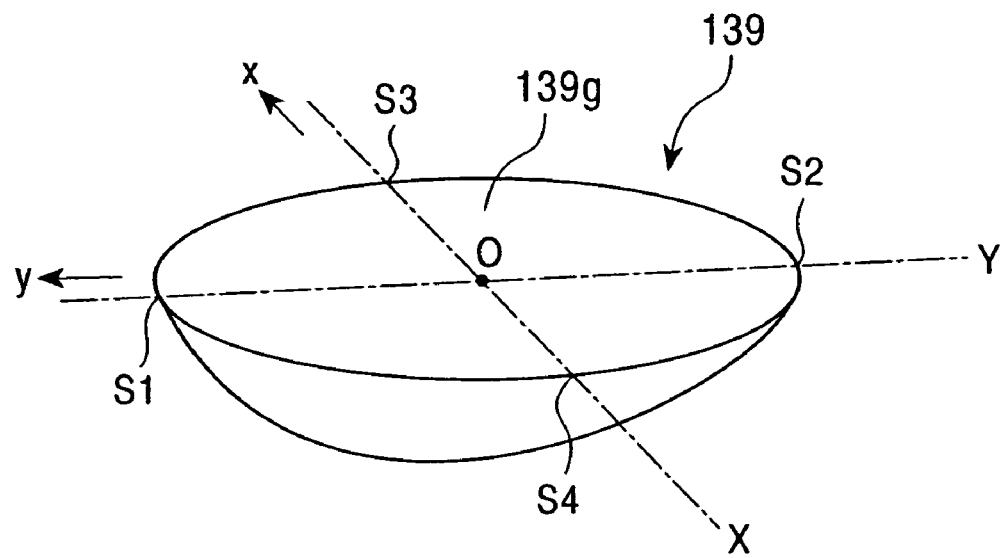
FIG. 10 is a perspective view of another form of the depressions in an active matrix display device of the present invention.
Figure 11:
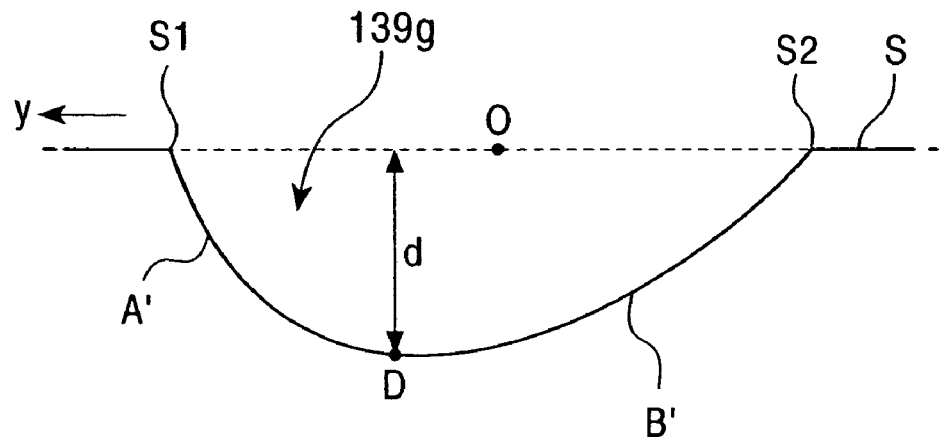
FIG. 11 is an enlarged sectional view of the depression shown in FIG. 10 taken along the y direction.
Figure 12:
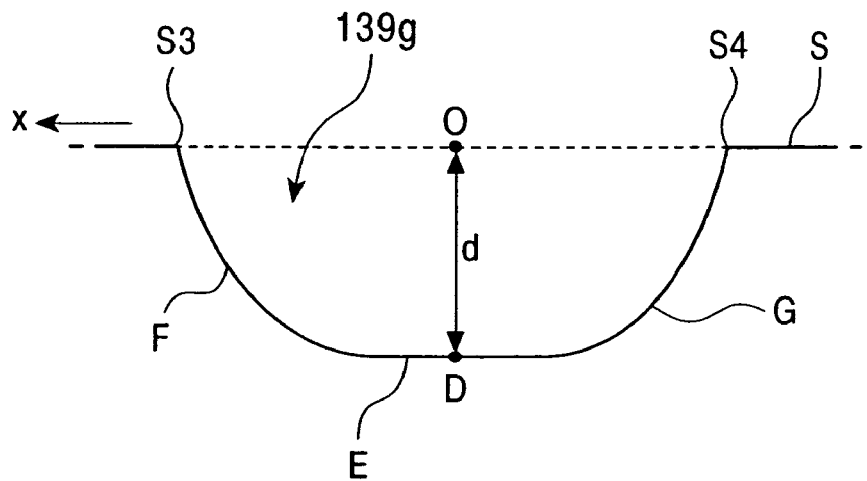
FIG. 12 is an enlarged sectional view of the depression shown in FIG. 10 taken along the x direction.
Figure 13:
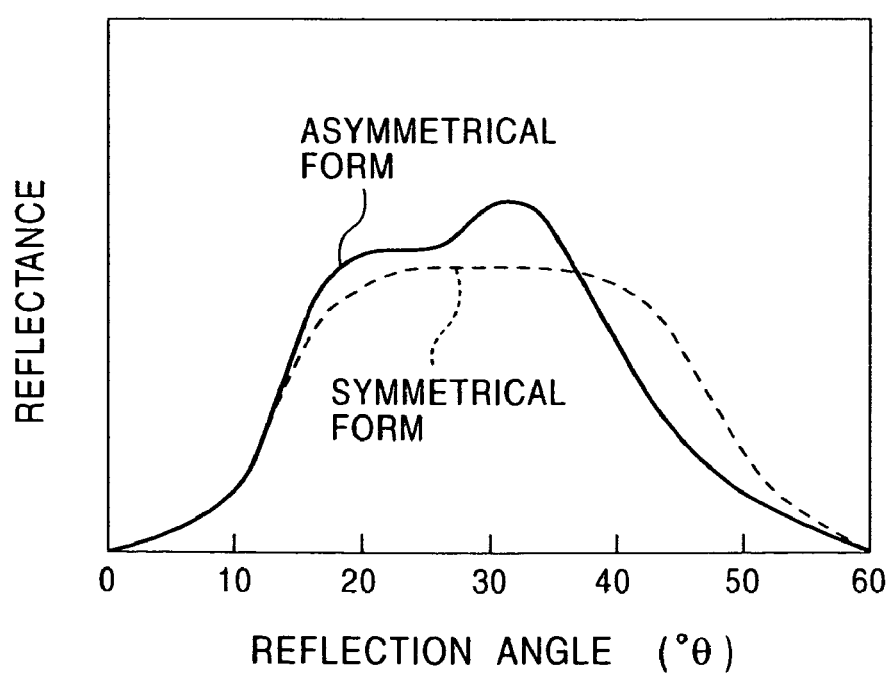
FIG. 13 is a graph showing reflection characteristics of a reflecting layer shown in FIGS. 10 to 12.

Another form of the depressions will be described with reference to FIGS. 10 to 13. FIG. 10 is a perspective view of one of depressions on the pixel electrodes in a liquid crystal panel of the present invention; FIGS. 11 and 12 are sectional views of the depression in the y direction and the x direction, respectively; and FIG. 13 is a graph showing the reflection characteristics of the depression.

In this form, the depressions 138g of the reflecting layer 137 of the liquid crystal panel 100 in the foregoing embodiment are modified as to the internal shape. The modified depressions also have an asymmetrical shape to give directivity to reflected light, as with the foregoing first embodiment.

Specifically, the depression 139g of the reflecting layer 139 is composed of a first curved surface having a small curvature and a second curved surface having a large curvature, as with the foregoing embodiment. In the Y section shown in FIG. 11, the first curved surface is designated by a first curve A' drawn from one outer edge S1 of the depression 139g to the deepest point D and the second curved surface is designated by a contiguous second curve B' drawn from the deepest point D of the depression 139g to the other outer edge S2.

The deepest point D of the depression 139g is shifted from the center O in plan view of the depression 139g in the y direction. The average tilt angles of the first curve A' and the second curve B' with respect to the horizontal surface of the substrate 111 are set in the range of 1° to 89° and the range of 0.5° to 88°, respectively. The average tilt angle of the first curve A' is larger than that of the second curve B'. The tilt angle δa at the outer edge S1 of the first curve A', which is the maximum tilt angle, is in the rage of about 4° to 35°, and preferably in the range of 4° to 30°, thus varying at random from one depression 139g to another. Thus, the depth d of the depressions 139g is irregularly varied in the range of 0.25 to 3 μm.

On the other hand, the first curved surface and second curved surface in the X section shown in FIG. 12 are substantially symmetrical to each other. The X section shape is defined by a curve E having a large curvature (that is, gentle and nearly linear) around the deepest point D. The tilt angle of the curve E with respect to the horizontal surface of the substrate 111 is about 10° or less. Thus, the depth d at the deepest point is irregularly varied in the range of 0.1 to 3 μm.

FIG. 13 shows a relationship between the reflection angle and the reflection brightness when light is emitted to the reflecting layer 139 from the y direction at an incident angle of 30°. In this modification, light entering into the liquid crystal panel at an angle of 30° from the y direction side is reflected at the reflecting layer 139. The brightness of the reflected light becomes higher than that in a symmetrical reflecting layer, when the reflection angle is less (about 20°) than or substantially equal to the mirror reflection angle, namely, 30°. Since the deepest point D of the depression 139g is shifted from the center O of the depression 139g in the y direction, the percentage of reflection from the second curve becomes larger than that from the first curve, and, accordingly, the brightness of reflective images increases at the y direction side. Also, since the vicinity of the deepest point D of the depression 139g has a gentle curve, the reflectance of the mirror reflection is increased.

The other parts are the same as in the foregoing embodiment, and the description will be omitted. Thus, the modification can achieve the same effect as in the foregoing embodiment. In addition, the brightness of images in a specific viewing direction defined by a reflection angle of 30° to 40° can be increased, and, thus, reflected light can be used effectively.

The present invention is not limited to the above-described embodiment and modification, and various modifications may be made without departing from the spirit of the invention.

For example, the form of the TFTs 130 is not limited to being inverted-staggered, but it may be regularly staggered.

Figure 14:
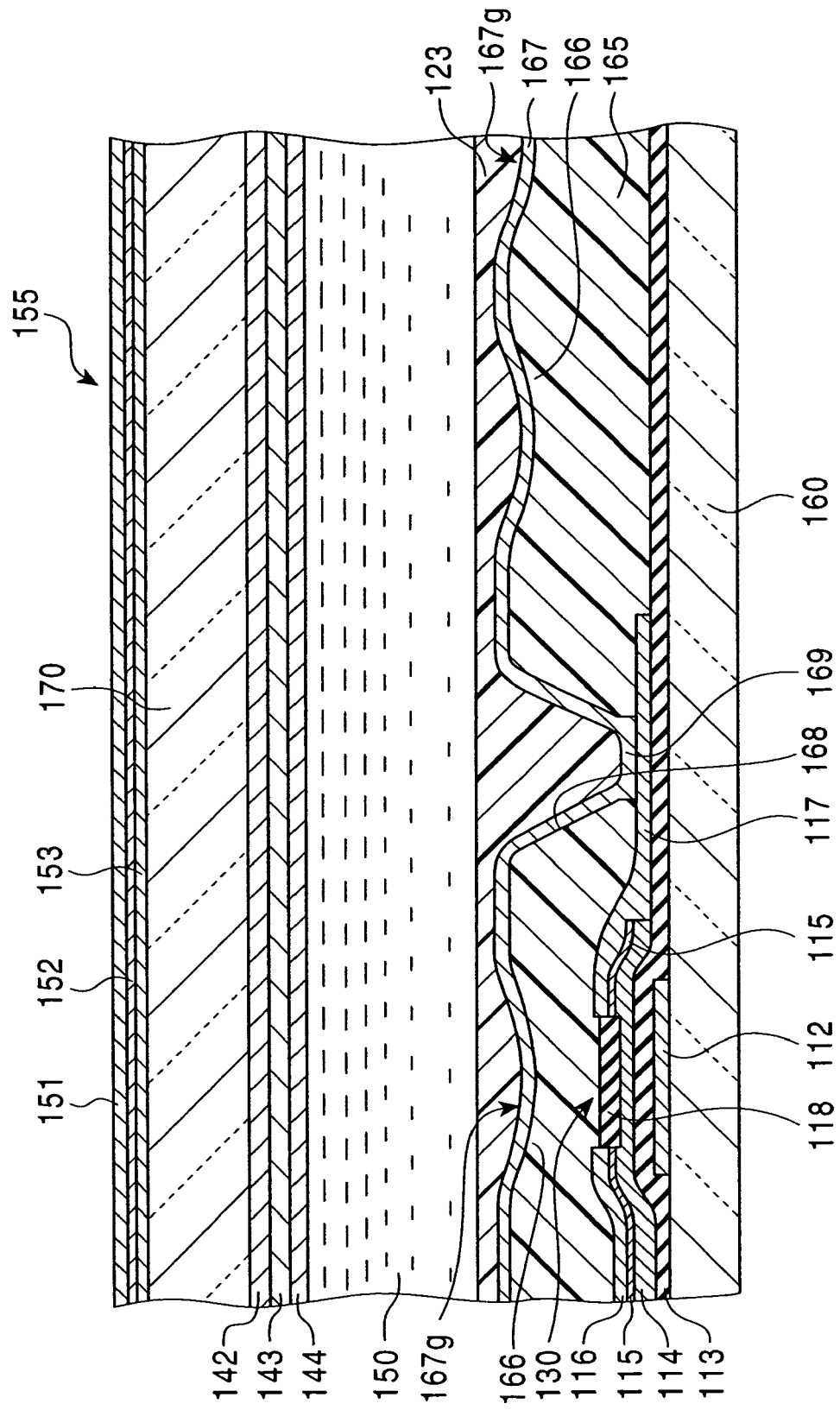
FIG. 14 is a sectional view of the general structure of a liquid crystal panel included in an active matrix display device according to an embodiment of the present invention.
Figure 15:
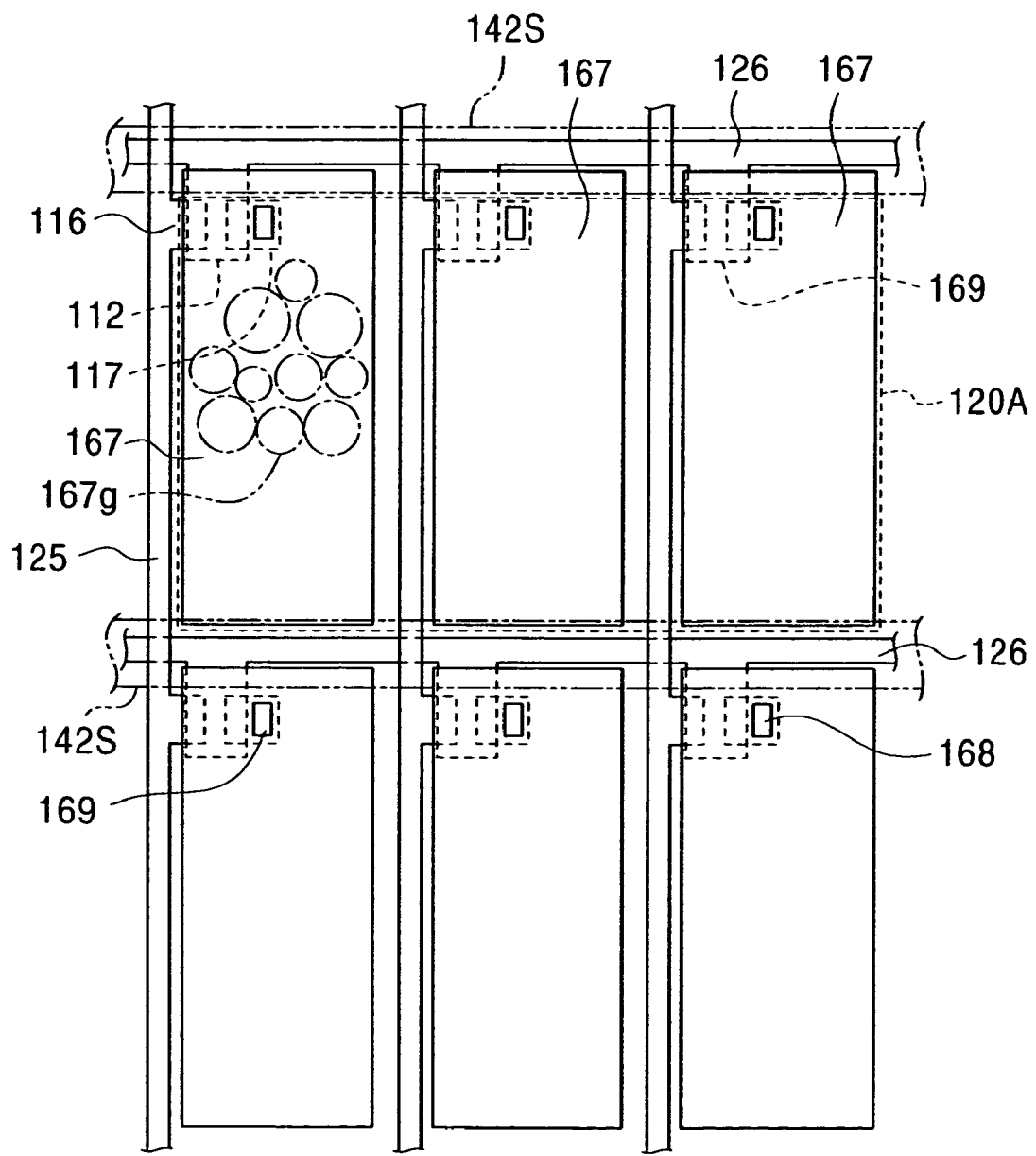
FIG. 15 is a plan view of the liquid crystal panel shown in FIG. 14.

FIGS. 14 and 15 show a second embodiment of a liquid crystal panel according to the present invention. The liquid crystal panel serves as the pixel electrodes and the reflecting layer, and the pixel electrodes are provided on the lower substrate side.

The liquid crystal panel 155 includes an element side substrate 160 (lower side, that is, the side more distant from viewers), an opposing substrate 170 on the side closer to the viewers, and a liquid crystal layer 150 serving as the optical modulation layer between the substrates 160 and 170. A polarizer 151, a first retardation film 152, and a second retardation film 153 are disposed on the opposing substrate 170, in that order from the outside. The basic structure of this liquid crystal panel, including the structure having the liquid crystal layer 150 lying between the substrates are the same as in the foregoing first embodiment. The same parts are designated by the same numerals, and the description in detail will be omitted. In the liquid crystal panel 155, the substrates 160 and 170 and the liquid crystal layer 150 constitute a liquid crystal cell.

In this embodiment, the TFTs 130 are formed on the element side substrate 160, and an organic or inorganic insulating layer 165 is provided so as to cover the scanning lines 126, the signal lines 125, and the source and drain electrodes 116 and 117 on the element side substrate 160. A plurality of depressions 166 are formed in the upper surface (liquid crystal side) of the insulating layer 165. The depressions 166 are covered with pixel electrodes 167, and thus, the pixel electrodes 167 also have depressions 167g. The pixel electrodes 167 are formed in a rectangular shape to cover substantially entire regions divided by the plurality of scanning lines 126 and signal lines 125, as shown in FIG. 15.

Contact holes 168 are formed in the regions of the insulating layer 165 covering the drain electrodes 117. A conducting portion 169 is formed in each contact hole 168 using part of the material of the pixel electrodes 167 to electrically connecting the corresponding pixel electrode 167 and drain electrode 117.

While the form of the depressions 167g in the pixel electrodes 167 is simplified in FIG. 15, the arrangement is shown in FIG. 15 in which the circular depressions 167g having random sizes are designated by two-dot chain lines.

On the other hand, the opposing substrate 170 is provided with a color filter layer 142, a common electrode layer 143, and an alignment layer 144 thereon, thereby controlling the orientation of the liquid crystal molecules in the liquid crystal layer 150 between the substrate 170 and the opposing pixel electrodes 167 and displaying color images.

Figure 16:
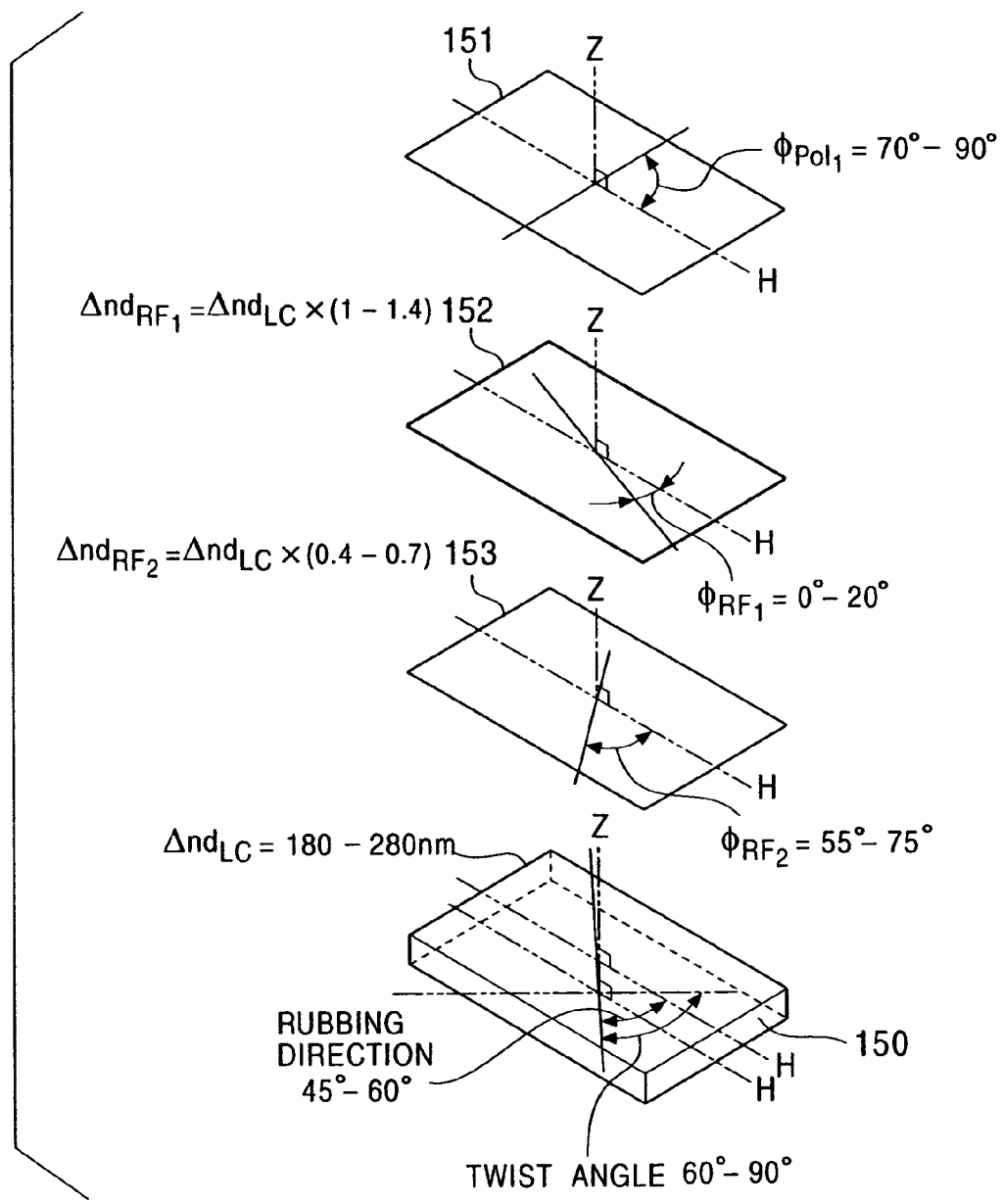
FIG. 16 is a representation of the relationships between the retardation value and the polarization angle and retardation angle in a liquid crystal panel including a polarizer and a retardation film.

Turning to FIG. 16, in the liquid crystal panel 155 of the present embodiment, the retardation value Δnd (Δn: refractive index anisotropy, d: thickness of the liquid crystal layer or cell gap) of the liquid crystal cell is set in the range of 180 nm to 280 nm, and preferably in the range of 200 to 250 nm, and the twist angle of the liquid crystal constituting the liquid crystal layer 150 is set in the range of 60° to 90°, and preferably in the range of 65° to 80°. The rubbing direction of the alignment layer 144 is set in the range of 45° to 60° from the horizontal direction.

The absorption axis of the polarizer 151 is set in the range of 70° to 90° in a counter clockwise direction, and preferably in the range of 80° to 87°. The retardation value Δnd and the slow axis of the first retardation film 152 are, preferably, set 100 to 140 percent to the Δnd of the foregoing cell and in the range of 0° to 20°, respectively. The retardation value Δnd and the slow axis of the second retardation film 153 are, preferably, set 40 to 70 percent to the Δnd of the foregoing cell and in the range of 55° to 75°, respectively.

In the present embodiment, the pixel electrodes 167 themselves not only have optical reflectivity, but also are provided with the depressions 167g having the same shape as the depressions 138g described in the foregoing embodiment. Therefore the present embodiment can achieve the same effect as in the foregoing embodiment.

Also, since the pixel electrodes 167 are formed right above the regions of the insulating layer 165 where the TFTs 130 to be formed, irrespective of where the TFTs 130 lie, the pixel electrodes 167 can be formed to be as large as possible. Consequently, the aperture ratio of the resulting liquid crystal display device can be increased.

In addition, since the TFTs 130 are covered with the respective insulating films 118 and further covered with the insulating layer 165, the possibility of the occurrence of damage to the TFTs 130 or wires resulting from trapped foreign matter in the transfer step of forming the depressions 166 on the upper surface of the insulating film 118 can be reduced. Hence, the insulating films 118 can serve as not only an etching stopper layer, but also a pattern-protecting layer during the transfer step.

Furthermore, by respectively setting the absorption axis of the above-described polarizer 151 and the retardation values and slow axes of the retardation films 152 and 153 in the above-described ranges, high-contrast, brighter images can be displayed.

A method for manufacturing the insulating layer on the element side substrate 160 shown in FIG. 14 will now be described.

After forming the scanning lines 126, the signal lines 125, and the TFTs 130, a $SiN_x$ insulating layer is formed to a thickness of, for example, 1000 Å, and subsequently, a corrugated shape are transferred in the insulating layer by stamping. Then, contact holes (about 20 μm square) are formed by dry etching, and aluminium pixel electrodes are deposited to a thickness of, for example, 1200 Å by sputtering. Thus, reflective pixel electrodes are provided on the insulting layer.

If the insulating layer is formed of an organic material, after forming the scanning lines 126, the signal lines 125, and the TFTs 130 on the element side substrate 160, an organic material solution, such as NN700 (produced by JSR), is applied by spin coating, and is baked at 80° C. for about 3 minutes with a heating device, such as a hot plate, to obtain an insulating layer with a thickness of about 2 μm. In order to form contact holes, the insulating layer is subjected to exposure at 300 $mJ/cm^2$, developed with a 0.14% trimethylamine (TMA) aqueous solution for about 1 minute, and baked at about 220° C. for about 1 hour in a heating device, such as an oven. Thus, contact holes of about 20 μm square are formed in the insulating layer. Then, for example, aluminum pixel electrodes are deposited to a thickness of 1200 Å by sputtering. Thus, reflective pixel electrodes are provided on the insulating layer.

Figure 17:
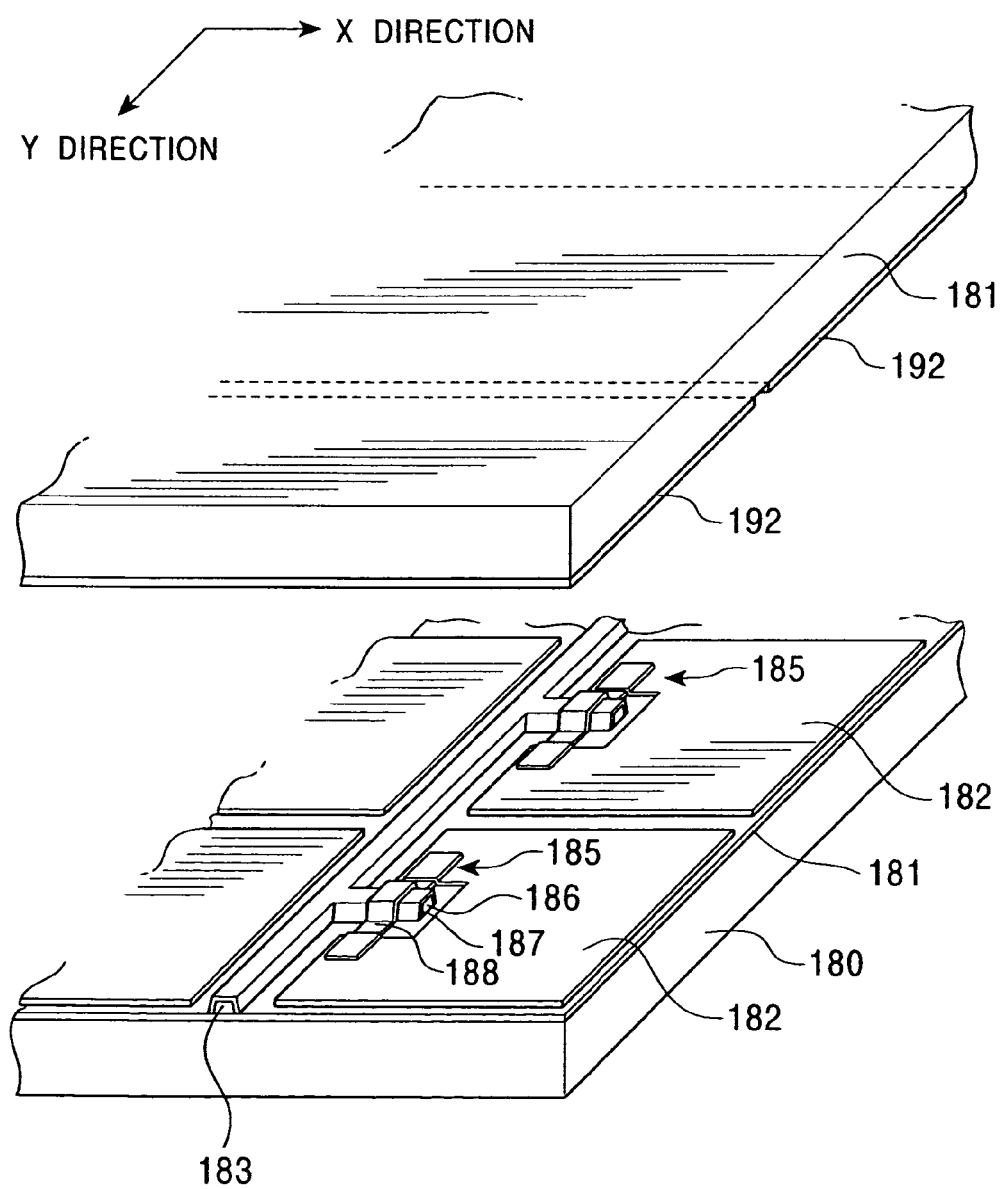
FIG. 17 is an exploded perspective view of a liquid crystal panel according to an embodiment of the present invention in which thin film diodes are used as switching elements.
Figure 18:
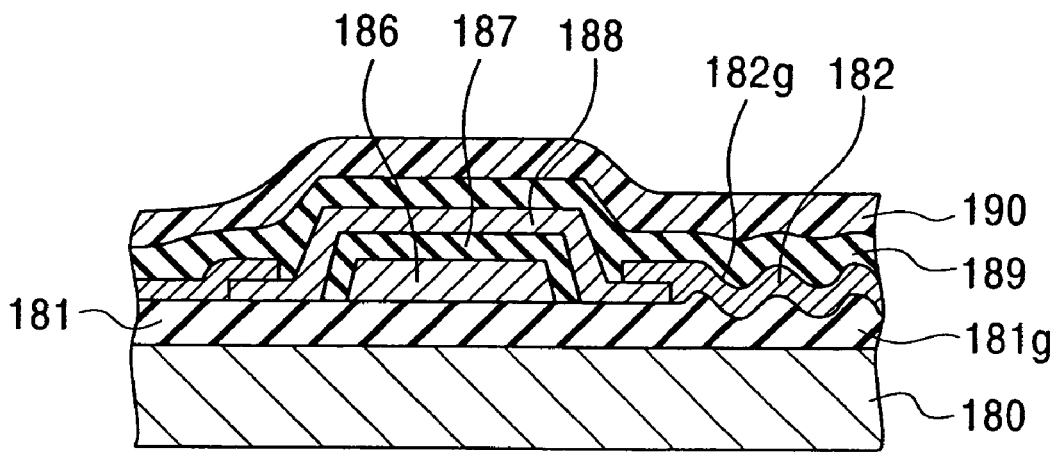
FIG. 18 is an enlarged sectional view of one of the thin film diodes.
Figure 19:
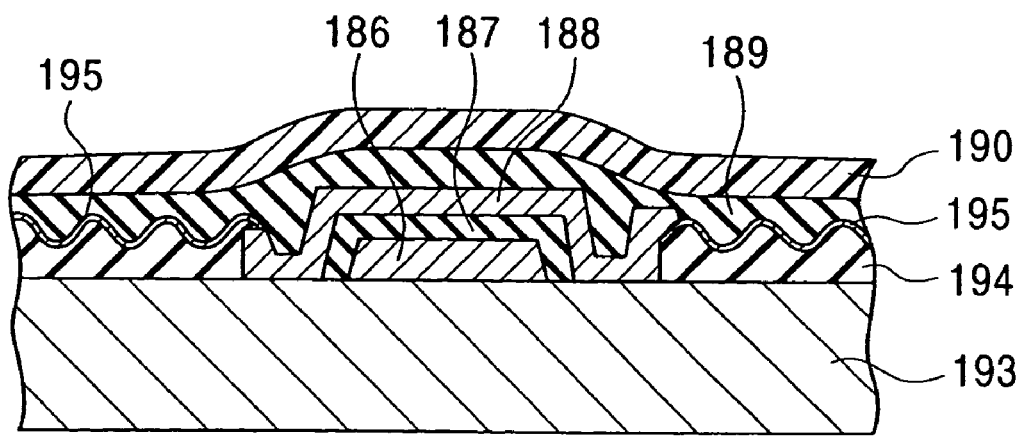
FIG. 19 is an enlarged sectional view of a thin film diode used as switching element included in a liquid crystal panel according to an embodiment of the present invention.
Figure 20:
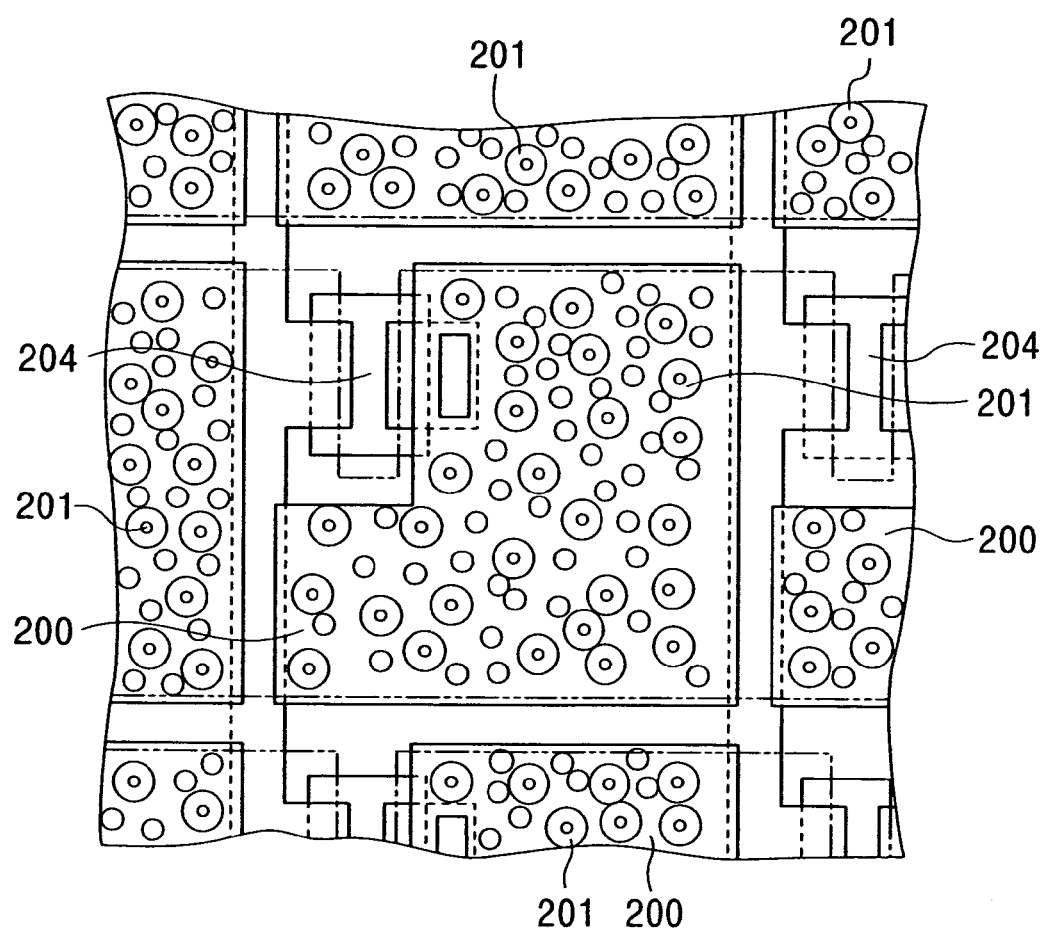
FIG. 20 is a plan view of a portion around a pixel electrode having doughnut-shaped projections and cylindrical projections of a known display device.
Figure 21:
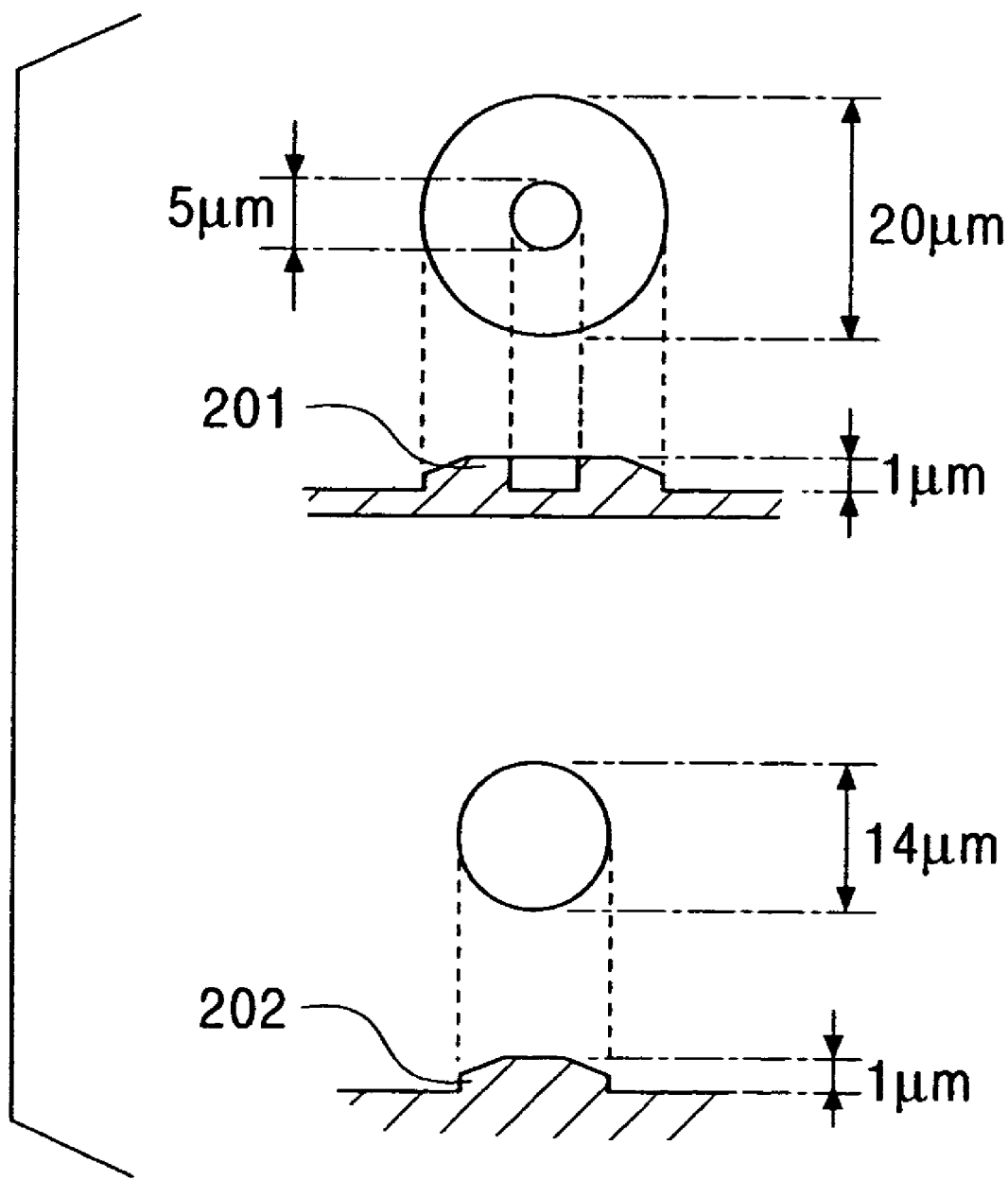
FIG. 21 is a sectional view of one of the projections formed on the pixel electrode.
Figure 22:
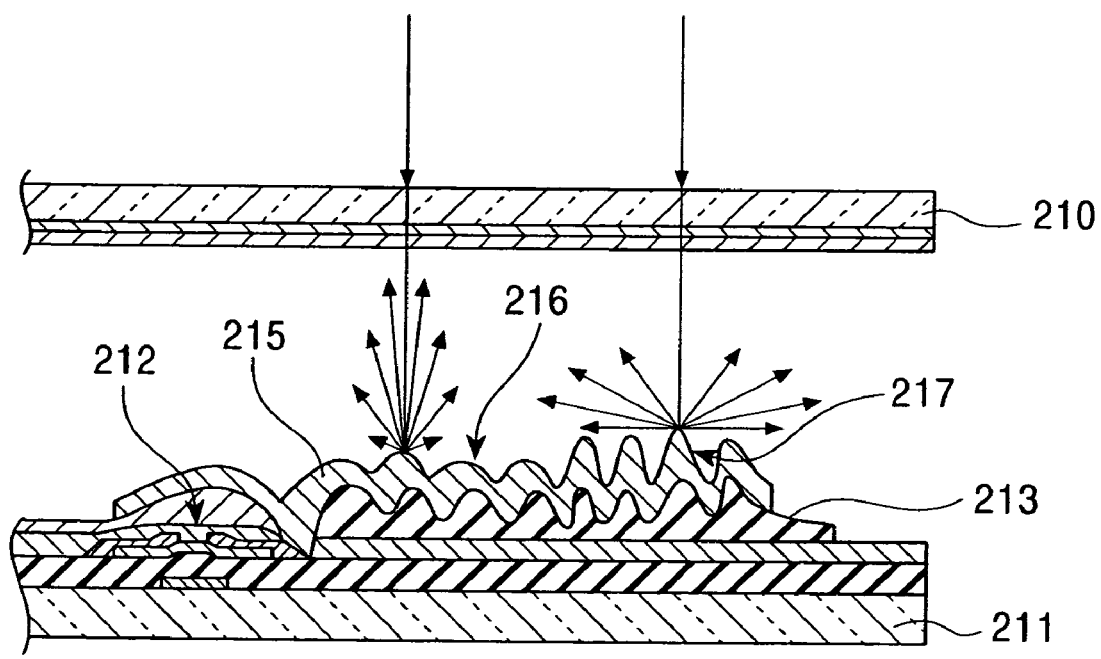
FIG. 22 is a sectional view of another liquid crystal panel in which pixel electrodes have two types of regions having different diffusibilities.

FIGS. 17 to 19 show a liquid crystal device including metal insulator metal (MIM) thin film diodes (TFDs), which includes metal layers and an insulating layer between the metal layers, to be used as two-terminal switching elements.

A liquid crystal panel 180 shown in FIG. 17 including MIM switching elements is provided with an insulating layer 181 on the surface thereof, and pixel electrodes 182 formed of a reflective metal, such as Al or Ag, are arranged in the x and y directions in a matrix, on the insulating layer 181. The pixel electrodes 182 aligning in the same line in the Y direction are each connected to a data line 183 through the respective TFDs 185. The TFDs 185 seem to be formed of elemental tantalum or a tantalum alloy when viewed from the substrate 181 side, and it includes a first conducting layer 186 diverging from the data line 183, an insulating layer 187 formed by anodizing the first conducting layer 186, and a second conducting layer 188 formed of chromium or the like, thus having a conductor/insulator/conductor sandwich structure.

As shown in FIG. 18, the same plurality of depressions 181g as in the second embodiment are formed at random in the insulating layer 181 underlying the pixel electrodes 182. Also, a plurality of depressions 182g are formed in the upper surface of the pixel electrodes 182 so that the pixel electrodes 182 exhibit the same asymmetrical reflection characteristics as in the second embodiment.

Next, an insulating layer 189 is formed to cover the TFDs 185 and the pixel electrodes 182. The insulating layer 189 is provided with an alignment layer 190 thereon.

In the opposing substrate 181, a plurality of rectangular scanning lines 192 extend in the row direction, corresponding to the plurality of pixel electrodes 182 arranged in the X direction. Thus, the scanning lines 192 serve as opposing electrodes to the pixel electrodes 182.

Since the pixel electrodes 182 exhibit asymmetrical reflection characteristics, the liquid crystal panel including the MIM TFDs 185 shown in FIGS. 17 to 19 can produce the same asymmetrical reflection characteristics as in the foregoing second embodiment and, thus, achieve the same effect as in the foregoing second embodiment.

FIG. 19 shows another MIM TFD used as a two-terminal element for a switching element in a reflective liquid crystal display device according to the present invention.

In this liquid crystal display device, a plurality of TFDs 185 having the same structure as the foregoing structure on a substrate 193, and an insulating layer 194 having the same plane shape as that of the pixel electrodes is formed in the vicinities of the TFDs 185 on the substrate 193. The insulating layer 194 is covered with a reflecting layer 195 formed of a reflective metal, such as Al or Ag. Thus, pixel electrodes, each having depressions are completed.

Since the liquid crystal panel including the MIM TFDs 185 shown in FIG. 19 can exhibit the same asymmetrical reflection characteristics as in the foregoing second embodiment and, thus, achieve the same effect as in the foregoing second embodiment.

In the liquid crystal panel including these TFDs 185, after forming the data lines 183 on the substrate, an oxide layer is deposited to form the insulating layer 187, and subsequently, an insulating layer serving as a diffusion layer is uniformly applied thereto. Then, a plurality of depressions are formed by stamping so as to make the section asymmetrical. This insulating layer is subjected to patterning to form in a desired shape by photolithography, and the second conducting layer 188 is formed over the surface. Then, regions to be switching elements and the pixel electrodes are patterned together to yield a substrate having the switching elements.

By using the above-described structure, a liquid crystal panel having switching elements and a reflecting layer having asymmetrical reflection properties can be manufactured trough a simple process.

The liquid crystal display devices described in the embodiments above are each a reflective display device having pixel electrodes doubling as a reflecting layer or a reflecting layer apart from the pixel electrodes. However, the present invention may, of course, be applied to a transflective liquid crystal display device.

For a transflective liquid crystal display device, a backlight is disposed at rear surface side of the liquid crystal panel, and the reflecting layer is formed to such a small thickness as to be illuminated by the backlight from the back side. Also, the reflecting layer may, of course, have a plurality of small clearance holes through which light passes to transmissively display images. In this instance, external light may be used to reflectively display images, with the backlight off.

What is claimed is:

1. An active matrix display device comprising:
   a pair of substrates;
   an optical modulation layer lying between the substrates;

a plurality of pixel electrodes provided on one of the substrates;

switching elements for driving the respective pixel electrodes, provided in the vicinity of the pixel electrodes;

one of a reflective and transflective reflecting layer formed on at least one substrate more distant from a viewer side than the other of the substrates, the reflecting layer forming the pixel electrodes; and an insulating layer containing a corrugated surface on which the reflecting layer is disposed and a flat portion on which the switching elements are disposed, wherein the reflecting layer has asymmetrical reflection properties.

2. An active matrix display device according to claim 1, wherein a cross section of the reflecting layer has a corrugated surface whose shape from a light-entering direction to a light-receiving direction has asymmetrical curvatures with respect to a normal to the substrate.

3. An active matrix display device according to claim 1, wherein a curve of a cross section of the reflecting layer comprises two curves having different curvatures from each other.

4. An active matrix display device according to claim 3, wherein a maximum tilt angle of the curvatures is 30°.

5. An active matrix display device according to claim 1, further comprising a color filter provided on the other substrate, the switching elements provided on the substrate.

6. An active matrix display device according to claim 1, further comprising a color filter, the switching elements and the color filter provided on the substrate more distant from the viewer side.

7. An active matrix display device according to claim 1, further comprising an insulating layer covering the switching elements and the pixel electrodes, and an alignment layer covering the insulating layer.

8. An active matrix display device according to claim 7, wherein the insulating layer covering the pixel electrodes has opposing corrugated surfaces.

9. An active matrix display device according to claim 7, wherein a surface of the insulating layer covering the pixel electrodes is substantially planar in an area of the pixel electrodes.

10. An active matrix display device according to claim 1, wherein the switching elements are MIM switching elements.

11. An active matrix display device according to claim 1, wherein the reflecting layer contacts an upper or lower surface and edge of an upper layer of the switching elements.

* * * * *

UNITED STATES PATENT AND TRADEMARK OFFICE
CERTIFICATE OF CORRECTION

PATENT NO. : 6,963,381 B2 Page 1 of 1
DATED : November 8, 2005
INVENTOR(S) : Mitsuru Kano et al.

It is certified that error appears in the above-identified patent and that said Letters Patent is hereby corrected as shown below:

Column 15,
Line 3, before "substrate." insert -- one --.

Column 16,
Line 3, before "substrate more distant" insert -- one --.

Signed and Sealed this

Ninth Day of May, 2006

JON W. DUDAS
*Director of the United States Patent and Trademark Office*